(12) United States Patent
Watanabe et al.

(10) Patent No.: US 10,977,515 B2
(45) Date of Patent: Apr. 13, 2021

(54) IMAGE RETRIEVING APPARATUS, IMAGE RETRIEVING METHOD, AND SETTING SCREEN USED THEREFOR

(71) Applicant: Hitachi, Ltd., Tokyo (JP)

(72) Inventors: Yuki Watanabe, Tokyo (JP); Kenichi Morita, Tokyo (JP); Tomokazu Murakami, Tokyo (JP); Atsushi Hiroike, Tokyo (JP); Quan Kong, Tokyo (JP)

(73) Assignee: HITACHI, LTD., Tokyo (JP)

( * ) Notice: Subject to any disclaimer, the term of this patent is extended or adjusted under 35 U.S.C. 154(b) by 82 days.

(21) Appl. No.: 16/171,710

(22) Filed: Oct. 26, 2018

(65) Prior Publication Data

US 2019/0147292 A1 May 16, 2019

(30) Foreign Application Priority Data

Nov. 13, 2017 (JP) .............................. JP2017-218058

(51) Int. Cl.
| | | |
|---|---|---|
| *G06K 9/62* | (2006.01) | |
| *G06T 7/70* | (2017.01) | |
| *G06K 9/46* | (2006.01) | |
| *G06K 9/00* | (2006.01) | |
| *G06F 16/583* | (2019.01) | |

(Continued)

(52) U.S. Cl.
CPC ....... *G06K 9/6215* (2013.01); *G06F 16/5838* (2019.01); *G06F 16/5854* (2019.01); *G06F 16/7335* (2019.01); *G06F 16/7837* (2019.01); *G06K 9/00362* (2013.01); *G06K 9/46* (2013.01); *G06K 9/6202* (2013.01); *G06T 7/70* (2017.01); *G06K 2009/6213* (2013.01); *G06T 19/00* (2013.01); *G06T 2207/10016* (2013.01);

(Continued)

(58) Field of Classification Search
CPC ...... G06K 9/6215; G06K 9/46; G06K 9/6202; G06K 9/00362; G06T 7/70; G06T 2207/30232
See application file for complete search history.

(56) References Cited

U.S. PATENT DOCUMENTS

| | | | |
|---|---|---|---|
| 6,459,824 B1 | 10/2002 | Lee et al. | |
| 2012/0294531 A1* | 11/2012 | Matsubara | ............ G06F 16/532 382/190 |
| 2015/0169994 A1 | 6/2015 | Chinen et al. | |

FOREIGN PATENT DOCUMENTS

JP 2016-162414 A 9/2016

OTHER PUBLICATIONS

Jie et al, "Who's DoingWhat: Joint Modeling of Names and Verbs for Simultaneous Face and Pose Annotation", NISP, 2009 (Year: 2009).*

(Continued)

*Primary Examiner* — Ruiping Li
(74) *Attorney, Agent, or Firm* — Mattingly & Malur, PC

(57) ABSTRACT

An image retrieving apparatus includes a pose estimating unit which recognizes pose information of a retrieval target including a plurality of feature points from an input image, a features extracting unit which extracts features from the pose information and the input image, an image database which accumulates the features in association with the input image, a query generating unit which generates a retrieval query from pose information specified by a user, and an image retrieving unit which retrieves images including similar poses according to the retrieval query from the image database.

13 Claims, 20 Drawing Sheets

(51) Int. Cl.
  *G06F 16/732* (2019.01)
  *G06F 16/783* (2019.01)
  *G06T 19/00* (2011.01)
(52) U.S. Cl.
  CPC .............. *G06T 2207/30196* (2013.01); *G06T 2207/30232* (2013.01); *G06T 2207/30241* (2013.01)

(56) References Cited

OTHER PUBLICATIONS

Extended European Search Report received in corresponding European Application No. 18205293.6 dated Mar. 7, 2019.
Albers, A. H. R. et al., "Smart Search & retrieval on Video Databases", Consumer Electronics, 2006, Jan. 7, 2006, pp. 475-476.
Biswas, S. et al., "An Efficient and Robust Algorithm for Shape Indexing and Retrieval", IEEE Transactions on Multimedia, Aug. 2010, pp. 372-385, vol. 12, No. 5.
Eichner, M. et al., "2D Articulated Human Pose Estimation and Retrieval in (Almost) Unconstrained Still Images", International Journal of Computer Vision, Mar. 28, 2012, pp. 190-214, vol. 99, No. 2.
El-Sallam, A. A. et al., "Human Body Pose Estimation from Still Images and Video Frames", Image Analysis and Recognition, Jun. 21, 2010, pp. 176-188.
Tripathi, R. K. et al., "Suspicious Human Activity Recognition: A Review", Artificial Intelligence Review, Feb. 28, 2017, pp. 283-339, vol. 50, No. 2.

\* cited by examiner

FIG. 17
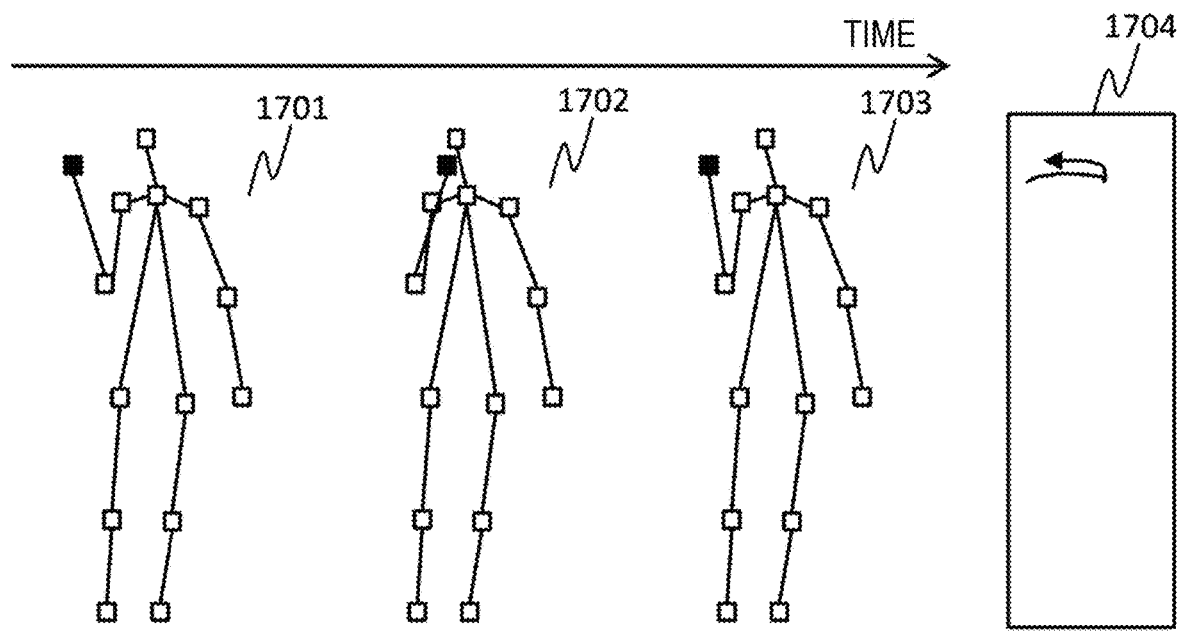
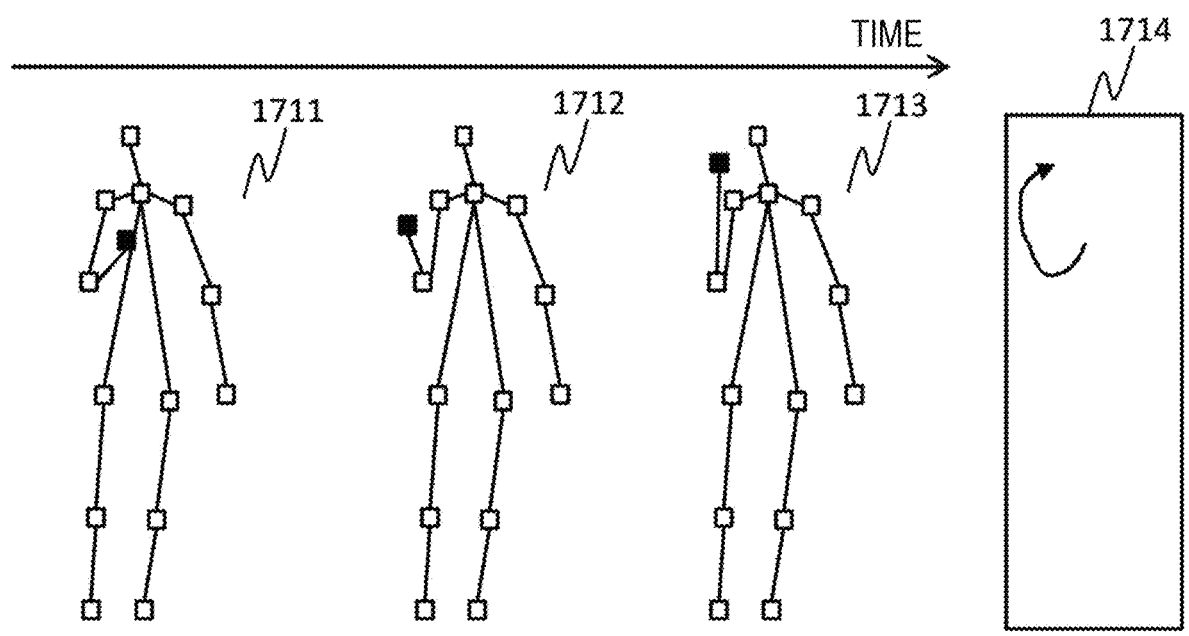

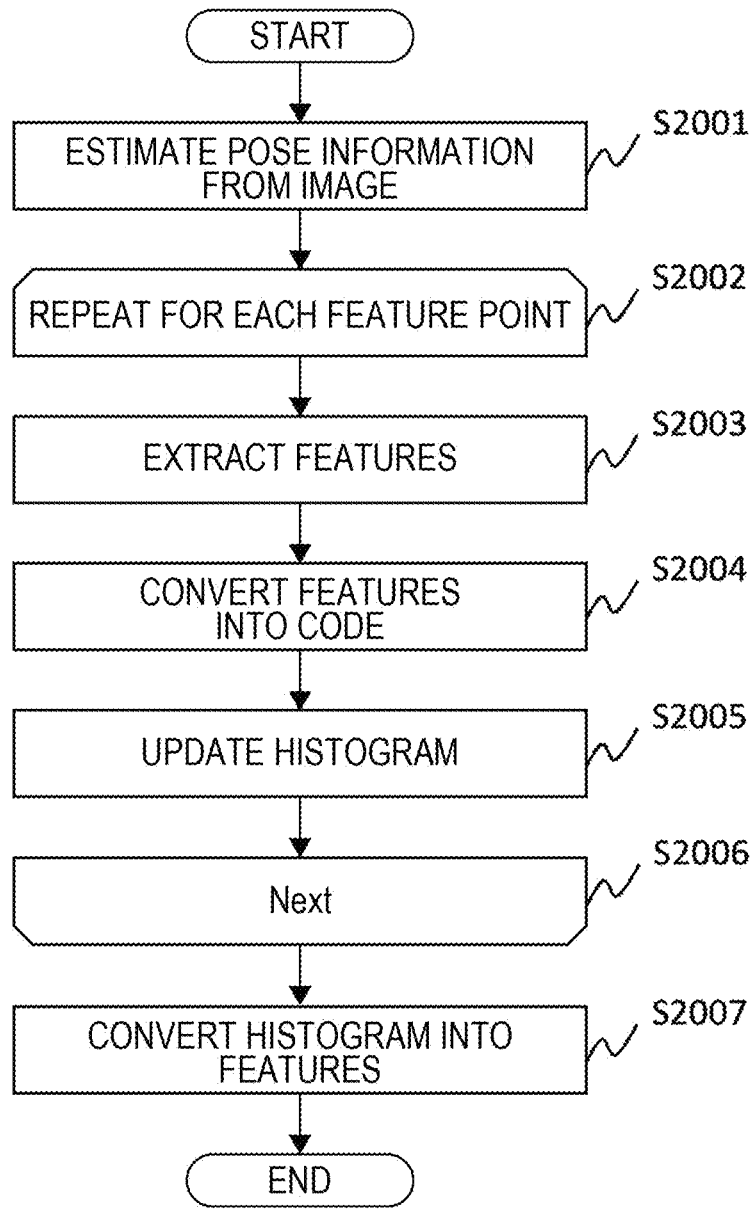

IMAGE RETRIEVING APPARATUS, IMAGE RETRIEVING METHOD, AND SETTING SCREEN USED THEREFOR

CROSS-REFERENCE TO RELATED APPLICATION

The present application claims priority from Japanese application JP 2017-218058, filed on Nov. 13, 2017, the contents of which is hereby incorporated by reference.

BACKGROUND OF THE INVENTION

1. Field of the Invention

The present invention relates to an image retrieving apparatus and an image retrieving method.

2. Description of the Related Art

In accordance with digital archiving of TV images and spread of video distribution services on the Internet, there has been an increasing needs for retrieving and classifying large-scale image data. In addition, expectations for analysis of monitoring images accumulated for security have been increased. Since it is difficult to manually apply metadata information for retrieval to the enormous data, similar image retrieval by using image features has been required. With the similar image retrieval, for example, a person having a color and a shape similar to those specified by a query can be retrieved by using the image features which have been automatically extracted from the monitoring image.

For example, in JP 2016-162414 A, a person region of an input image is specified, the person region is divided into a plurality of partial regions, the partial region is divided into a plurality of small regions, a cluster of the small regions is formed in each partial region, a cluster to be a query candidate is selected based on an attribute of the cluster, a query element is generated from the small region of the selected cluster, and a retrieval query to retrieve a person by combining the query elements is generated.

SUMMARY OF THE INVENTION

JP 2016-162414 A discloses a method of using pose information to exclude background information (region other than person region). However, JP 2016-162414 A does not disclose a configuration for using the pose information of the person as a retrieval query.

The present invention has been made in consideration of the related art and the problems and, for example, is an image retrieving apparatus which includes a pose estimating unit which recognizes pose information of a retrieval target including a plurality of feature points from an input image, a features extracting unit which extracts features from the pose information and the input image, an image database which accumulates the features in association with the input image, a query generating unit which generates a retrieval query from pose information specified by a user, and an image retrieving unit which retrieves images including similar poses according to the retrieval query from the image database.

According to the present invention, it is possible to provide an image retrieving apparatus and an image retrieving method capable of improving a retrieval accuracy and a retrieval efficiency by generating a retrieval query reflecting pose information on a retrieval target.

BRIEF DESCRIPTION OF THE DRAWINGS

FIG. 17 is a diagram for explaining motion recognition using a trajectory according to a fourth embodiment;

FIG. 20 is a flowchart of features extracting processing from an entire image using the pose information according to the fifth embodiment.

DESCRIPTION OF THE PREFERRED EMBODIMENTS

Embodiments of the present invention will be described below with reference to the drawings.

First Embodiment

Figure 1:
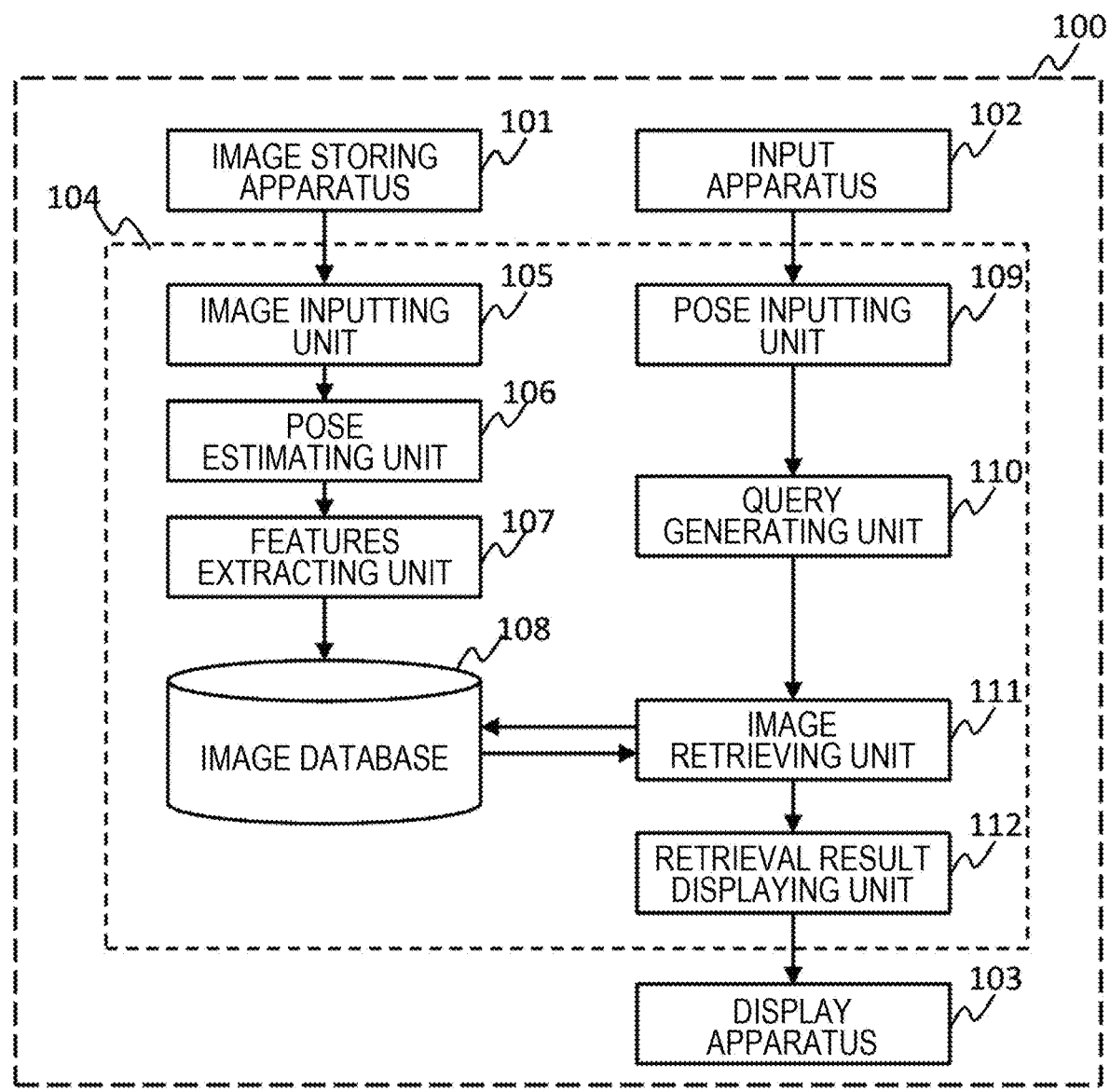
FIG. 1 is a block diagram of a configuration of an image retrieving system according to a first embodiment.

FIG. 1 is a block diagram of an exemplary configuration of an image retrieving system 100 according to the present embodiment. As use cases of the image retrieving system 100, the following cases are considered, for example, (1) monitoring video analysis application: a case where a police official retrieves a person whose behavior is suspicious in a monitoring camera image in a specific station, a case where a user such as an employee of a large commercial facility management company analyzes a customer's behavior in a monitoring camera image in the facility, and a case where a staff of a nursing home finds an abnormal behavior such as crowding and falling down of a person in the nursing home, (2) coaching application: retrieval of competitive sports, dance, and choreography of dance, and (3) content retrieval application: retrieval of an image or a video of a person making a specific pose from movies, TV programs, and images on the Web. However, the use case is not limited to these. The examples regarding a person have been described above. However, when pose information which is a set of feature points can be defined, the image retrieving system 100 can be operated with respect to an arbitrary object. In the following description, a retrieval target is set to "person", the configurations will be described using the use for analyzing monitoring video in (1) as an example.

The term "pose" here indicates a set of feature points which commonly exists in a target object. For example, in a case of a person, the "pose" can be defined by a set of feature points such as {head, neck, right shoulder, right elbow, right wrist, left shoulder, left elbow, left wrist, right waist, right knee, right ankle, left waist, left knee, and left ankle}. The feature points are detected by image recognizing processing and have information on coordinates and reliability in an image. The "reliability" here is a value indicating a probability that the feature point exists at the detected coordinates, and is calculated based on statistical information.

In addition, hereinafter, an "image" means information indicating a moving image or a still image, and a "video" means information including audio data and the like other than the image.

In FIG. 1, the image retrieving system 100 efficiently retrieves images including objects in similar poses by retrieving an image database 108 using pose information which is input by a user as a retrieval condition. The image retrieving system 100 includes an image storing apparatus 101, an input apparatus 102, a display apparatus 103, and an image retrieving apparatus 104. The image retrieving apparatus 104 includes an image inputting unit 105, a pose estimating unit 106, a features extracting unit 107, the image database 108, a pose inputting unit 109, a query generating unit 110, an image retrieving unit 111, and a retrieval result displaying unit 112.

The image storing apparatus 101 is a storage medium for storing still image data or moving image data and includes a hard disk drive incorporated in a computer or a storage system connected by a network such as a Network Attached Storage (NAS) or a Storage Area Network (SAN). Furthermore, the image storing apparatus 101 may be a cache memory which temporarily holds image data which is continuously input from a camera.

The input apparatus 102 is an input interface, such as a mouse, a keyboard, and a touch device, to transmit a user's operation to the image retrieving apparatus 104. Furthermore, the input apparatus 102 may be a dedicated device for transmitting pose information to the system. For example, a device which analyzes data of a distance sensor and can input information on feature points of an object, a human-shaped device which has an angle sensor in a joint, a device which attaches an acceleration sensor in a joint of a human body and obtains pose, and the like can be used. The display apparatus 103 is an output interface such as a liquid crystal display and is used to display a retrieval result of the image retrieving apparatus 104 and used for interactive operation with a user.

The image retrieving apparatus 104 executes registering processing for extracting information necessary for retrieval and making a database of the information and retrieving processing using the registered data. The registering processing will be described below. The details of the registering processing will be described with reference to the flowchart in FIG. 5.

In the registering processing, pose information of an object is recognized from a newly-registered image, and image information and the pose information are registered in the image database 108 in association with each other. That is, a recognition target region is extracted from the still image data or the moving image data accumulated in the image storing apparatus 101 as necessary, and the pose information is obtained from the extracted region by the image recognizing processing and is registered in the image database 108. The pose information is a set of one or more feature points, and each feature point is expressed by coordinates in the image and a value of the reliability. The reliability of the feature point is indicated by a real number equal to or more than zero and equal to or less than one, and as the reliability gets closer to one, a probability that the feature point is indicated by the correct coordinates is higher. In the registering processing, features which are obtained by quantifying a feature of appearance of the image and information on an attribute identified by the image recognizing processing are extracted, and the extracted information is registered in the image database 108 in association with the pose information.

The image retrieving apparatus 104 executes retrieving processing to retrieve an image which matches the retrieval condition from the image database 108 by using the retrieval condition specified by a user from the input apparatus 102 and present the information on the display apparatus 103. In the retrieving processing, the user specifies the pose information as the retrieval condition. For example, the user determines the pose information to be used for retrieval by moving the feature points displayed on the display apparatus 103. Details will be described later with reference to FIG. 10. If the pose information to be used can be specified, the pose information may be input by the dedicated device or by sentences or voice. The user can obtain an image including an object which matches the specified pose information through the image retrieval using the pose information. That is, when the user retrieves a desired image, the user can find an image including a similar pose by inputting the pose information of the object in addition to metadata such as a place and a time and the features of the appearance of the image. Therefore, the image retrieval accuracy is improved. Furthermore, by adding the image feature and the attribute to the conditions in addition to the pose information, a retrieval result which is close to a retrieval intention of the user can be efficiently presented.

The image inputting unit 105 receives an input of the still image data or the moving image data from the image storing apparatus 101 and converts the data into a data format used in the image retrieving apparatus 104. For example, in a case where the data received by the image inputting unit 105 is a moving image data, the image inputting unit 105 executes moving image decoding processing for decomposing the data into frames (still image data format).

The pose estimating unit 106 recognizes the pose information included in the input image. Pose estimating processing is executed in object units defined by the system. For example, a system assuming a person as one object detects a person included in the image, executes region detecting processing, and executes pose recognizing processing for each detected region. A known method can be used for the detecting processing. As a method for estimating the pose, there is a method of improving an accuracy by detecting feature points of a plurality of objects in an image and using the detected feature points for the pose estimation. In a case where such as pose estimating method is used, the region detecting processing which is executed in advance can be omitted. Furthermore, in a case where the input data is a moving image, tracking processing may be executed on the same object between frames.

To estimate the pose, it is necessary to prepare a regression model for outputting the coordinates of the feature point of the object. The regression model for outputting a plurality of coordinate values from the input image can be constructed by using a large amount of training data and a machine learning method such as deep learning. The training data includes a pair of an image and a correct label. The regression model which estimates the pose information including arbitrary feature points of an arbitrary object can be prepared by changing a kind of the object in the image in the training data and changing the definition of the feature point to be applied as the correct label.

The features extracting unit 107 extracts features used for retrieving an image from the pose information. The features can be extracted by an arbitrary method as long as the features indicate the pose information. In the following description, features calculated from the pose information are indicated as "pose features", and features indicating an appearance of the image other than the pose features are indicated as "image features", and these features are distinguished from each other. That is, the image features are value, which can be compared between images, a color, of the features such as a shape, and the like of the image. Both features are values with which similarity between the images can be compared, and, for example, expressed by fixed-length vectors. For example, the pose features may be the coordinates of the respective feature points included in the pose information which are arranged. In a case where coordinates are used as the feature point, by executing normalizing processing by using the size and the center coordinates of the object, the similar pose features regarding the objects of which apparent sizes are different or objects respectively existing at different coordinates can be obtained. In addition to the method of directly using the coordinate values, for example, image features which are extracted from a simulation object rendered by using the coordinates of the feature point and data of a distance and an angle between the feature points can be used as the pose features.

In the present embodiment, the pose features are used for retrieval. However, it is possible to collect features of a typical pose and makes a pose identifier learn the collected features by machine learning. The features extracting unit 107 identifies the pose by using the pose identifier which has learned the features and may register the pose in the image database 108 in association with personal information.

In addition, the features extracting unit 107 extracts the image features indicating the appearance of the image, in addition to the pose features. Thus, retrieval can be made by using not only the pose information but also the appearance of the image as a condition. The image features may be extracted from an entire object region and may be extracted for each region near the feature point. The features extracting unit 107 may recognize the kind of the object in the image and extract attribute information. Attribute recognizing processing is executed by a model for attribute recognition which has been learned in advance.

The image database 108 holds the image information and the personal information obtained by the registering processing. In response to an inquiry from each unit of the image retrieving apparatus 104, the image database 108 can retrieve registered data which satisfies the given condition and can read data having a specified ID. Details of the structure of the image database 108 will be described later with reference to FIG. 3.

The operation of each unit of the image retrieving apparatus 104 in the registering processing has been described above. Next, an operation of each unit of the image retrieving apparatus 104 in the retrieving processing will be described. Details of the retrieving processing will be described with reference to the flowchart in FIG. 9.

The pose inputting unit 109 receives the pose information which is input by a user via the input apparatus 102. As described above, the pose information includes a set of a plurality of feature points, and the feature point has the coordinates and the reliability. However, it is not necessary for the information received at this time include the information on the reliability. It is possible to prepare an input form on a screen to input the coordinate information, and it is possible to intuitively input the coordinate information by drawing the feature point. In addition, by templating characteristic pose in advance, the user may select the pose. In addition, data may be directly input from a dedicated device without using the screen, and an interface used for selecting the template by executing voice recognition and natural language processing using voice and texts as an input may be prepared.

The query generating unit 110 converts the pose information obtained by the pose inputting unit 109 into a retrieval query. The retrieval query is features and, for example, is expressed by a fixed-length numerical vector. The conversion from the pose information into the retrieval query is performed by means equivalent to the features extracting unit 107. Furthermore, the query generating unit 110 can generate multi-query based on the plurality of pose features and image features. In addition, metadata such as attributes, times, and places can be added to the retrieval condition.

The image retrieving unit 111 obtains the corresponding registered data from the image database 108 by using a query vector obtained by the query generating unit 110. In the retrieving processing, the query vector and a distance between the vectors in the registered data are calculated, and the distances are rearranged in order from a shorter distance, and a certain number of distances are output. The Square Euclidean distance is used to calculate the distance. For example, when it is assumed that the query vector be $Vq=(q1, q2, q3, \ldots)$ and the vector of the registered data be $Vp=(p1, p2, p3, \ldots)$, the square Euclidean distance d(Vp, Vq) is calculated as $d(Vp, Vq)=(p1-q1)^2+(p2-q2)^2+(p3-q3)^2+\ldots$. Here, "^2" means a square. It can be considered that, as the square Euclidean distance is shorter, the image is closer to the registered data which matches the retrieval condition. In this example, an example in which the square Euclidean distance is used as an index of the degree of similarity between the images has been described. However, by using a calculation method with which coincidence between the query and the registered data can be evaluated, data can be retrieved by using an arbitrary index.

The retrieval result displaying unit 112 displays the registered data obtained by the retrieving processing by the image retrieving unit 111 on the display apparatus 103. Since the data obtained by the retrieving processing is related to the object, a screen necessary for the user is generated by obtaining information on the original image from which the object has been detected from the image database 108 as necessary and processing the image.

The operation of each unit of the image retrieving apparatus 104 in the retrieving processing has been described above. The registering processing and the retrieving processing by the image retrieving apparatus 104 can be concurrently executed. For example, by setting a retrieval query in advance and regularly executing the retrieving processing, the present invention can be applied to a real time system having a function for issuing a notification on a screen when a specific pose is included in a newly input image.

Figure 2:
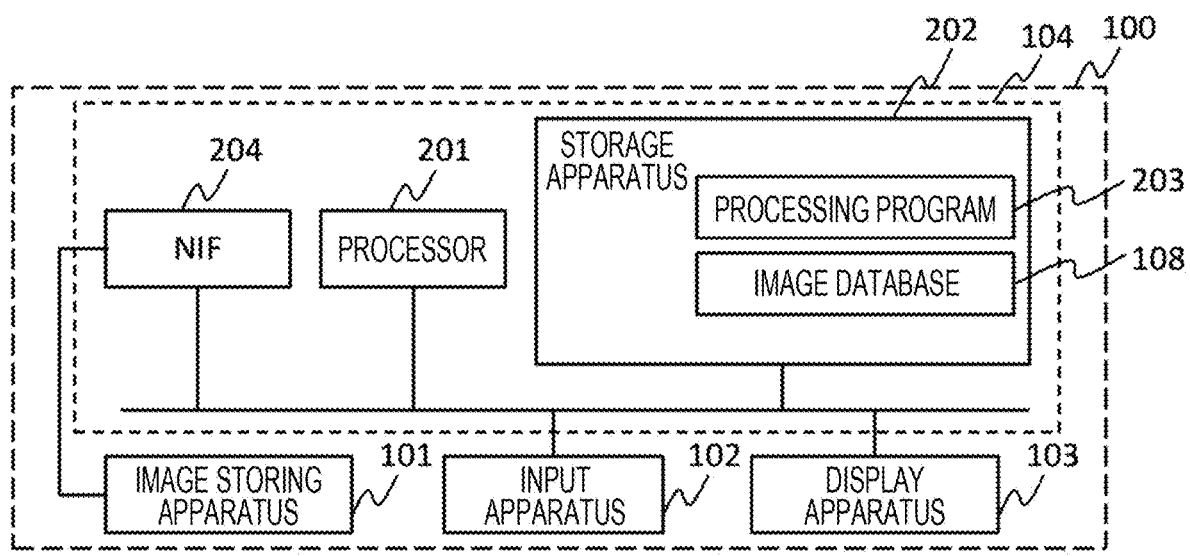
FIG. 2 is a block diagram of a hardware configuration of the image retrieving system according to the first embodiment.

FIG. 2 is a block diagram of an exemplary hardware configuration of the image retrieving system 100 according to the present embodiment. In FIG. 2, the image retrieving apparatus 104 includes a processor 201 and a storage apparatus 202 which are mutually connected. The storage apparatus 202 may include an arbitrary kind of storage medium. The storage apparatus 202 includes a combination of a semiconductor memory and a hard disk drive.

Functional units including the image inputting unit 105, the pose estimating unit 106, the features extracting unit 107, the pose inputting unit 109, the query generating unit 110, the image retrieving unit 111, and the retrieval result displaying unit 112 illustrated in FIG. 1 are realized by executing a processing program 203 stored in the storage apparatus 202 by the processor 201. In other words, processing executed by each functional unit is executed by the processor 201 based on the processing program 203. Furthermore, data in the image database 108 is stored in the storage apparatus 202. In a case where the image retrieving system 100 includes a plurality of devices for the purpose of processing load distribution and the like, a device including the image database 108 and a device for executing the processing program 203 may be physically different devices connected via a network.

The image retrieving apparatus 104 further includes a network interface device (NIF) 204 connected to the processor 201. It is assumed that the image storing apparatus 101 be a NAS or a SAN which is connected to the image retrieving apparatus 104 via the network interface device 204. The image storing apparatus 101 may be included in the storage apparatus 202.

Figure 3:
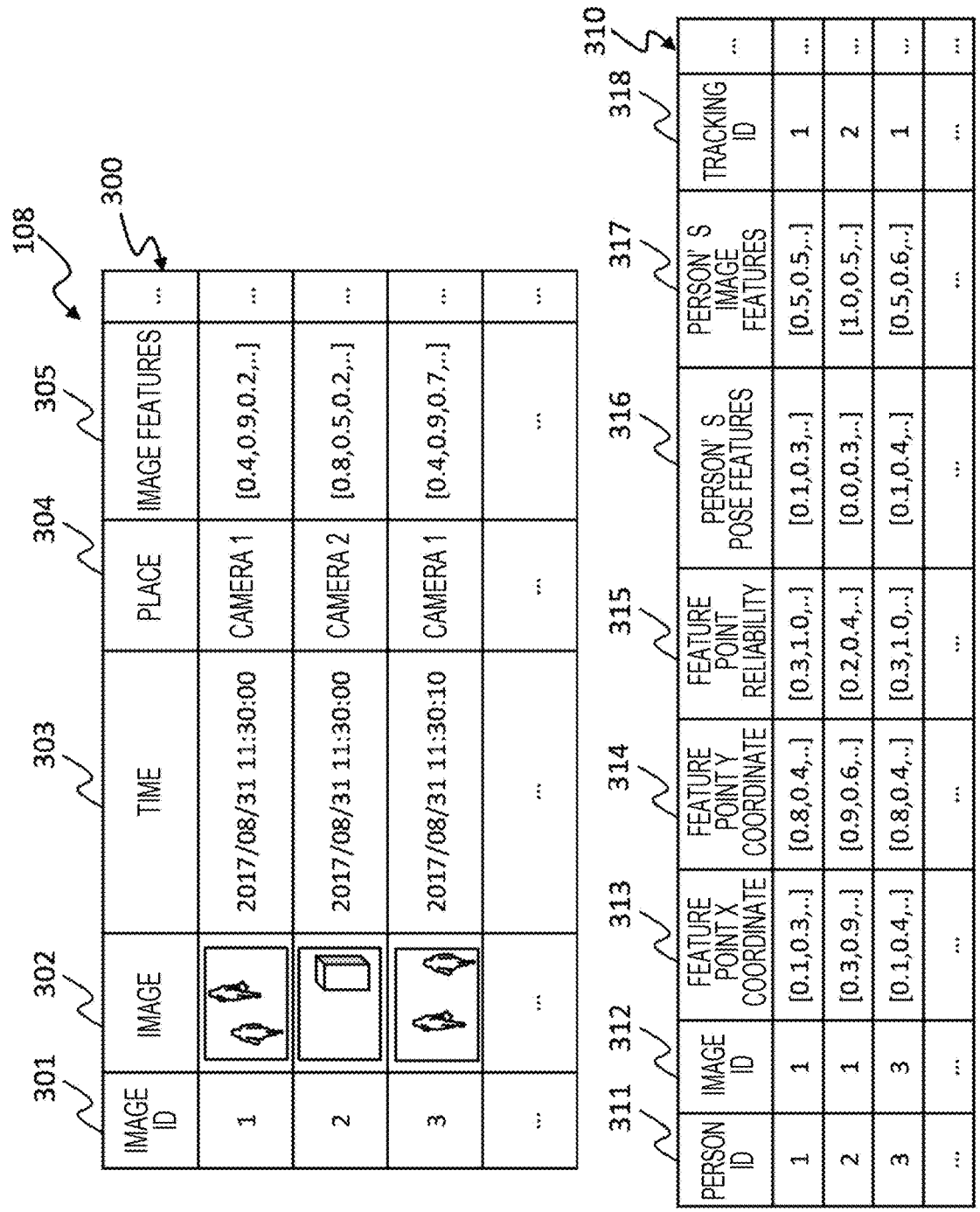
FIG. 3 is an explanatory diagram of a configuration of an image database according to the first embodiment.

FIG. 3 is an explanatory diagram of a configuration and a data example of the image database 108 according to the present embodiment. The information used by the system in the present embodiment does not depend on a data structure and may be expressed in any data structure. FIG. 3 illustrates an example of a table format. However, for example, a data structure appropriately selected from among a table, a list, a database, or a queue can store information.

In FIG. 3, the image database 108 includes, for example, an image table 300 for holding the image information and a person table 310 for holding the personal information. Each table configuration and a field configuration of each table in FIG. 3 are only exemplary, and for example, a table and a field may be added according to an application. Furthermore, if similar information is held, the table configuration may be changed. For example, the image table 300 and the person table 310 may be combined into a single table.

The image table 300 includes an image ID field 301, an image data field 302, a time field 303, a place field 304, and an image features field 305.

The image ID field 301 holds an identification number of each image information. The image data field 302 holds image data used when the retrieval result is displayed. The time field 303 holds time data at which the image is obtained. The place field 304 holds information on the place where the image is obtained. The image features field 305 holds a numerical vector indicating the feature of the entire image. For example, a proportion of red components, edge information, and the like are held.

The person table 310 includes a person ID field 311, an image ID field 312, a feature point X coordinate field 313, a feature point Y coordinate field 314, a feature point reliability field 315, a person pose features field 316, a person image features field 317, and a tracking ID field 318.

The person ID field 311 holds an identification number of each personal information. The image ID field 312 is a reference to the original image from which the person has been detected and holds the image ID managed in the image table 300. The feature point X coordinate field 313 holds vector data in which horizontal-direction coordinates (X coordinate) of all the feature points of the person are arranged in order. For example a coordinate value may be normalized to be a value of zero to one within an image region and stored. The feature point Y coordinate field 314 holds vector data in which vertical-direction coordinates (Y coordinate) of all the feature points of the person are arranged in order. The feature point reliability field 315 holds vector data in which reliabilities of all the feature points of the person are arranged in order. The person pose features field 316 holds vector data of the features calculated based on the pose information of the person. The person image features field 317 holds vector data of the features calculated based on the image of the person. The tracking ID field 318 holds an ID which indicates the identity the person in different images.

The image retrieving apparatus 104 according to the present embodiment extracts the pose information of the object from the input image so that the user can retrieve the images having similar poses in addition to the appearance of the image. It is necessary to input the image to be retrieved to the image retrieving apparatus 104 in advance and resister the image in the database. The image retrieving apparatus 104 extracts the pose information by executing the image recognizing processing on the input image.

Figure 4:
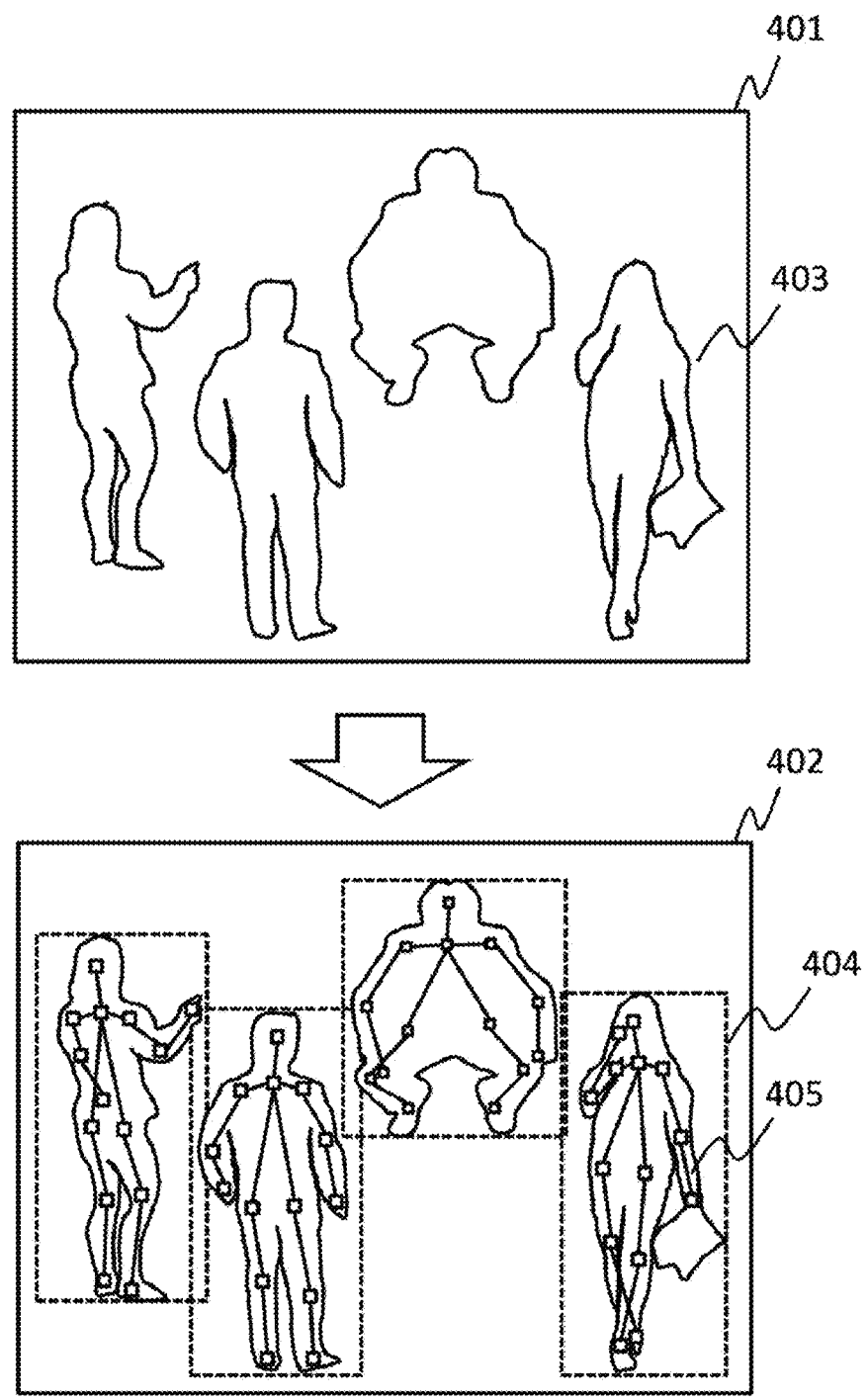
FIG. 4 is a diagram for explaining pose information estimating processing from an image according to the first embodiment.

FIG. 4 is a diagram for explaining the result of the image recognizing processing executed by the image retrieving apparatus 104. When an input image 401 in which a plurality of people appears is input, a region and pose for each person are recognized. An image 402 is an image in which recognition results are superimposed and displayed. For example, regarding a person 403 appeared in the input image 401, a region 404 and a pose 405 are obtained. The pose information is indicated by a set of feature points. When connection relations between the feature points are defined, the pose information can be visualized by dots and lines as the pose 405.

Regarding the recognition processing and the database registering processing of the input image, a procedure at the time of the registration may be optional if the information on the exemplary configuration of the database described with reference to FIG. 3 is accumulated. However, for example, a procedure illustrated in the flowchart in FIG. 5 to be described later may be used.

Figure 5:
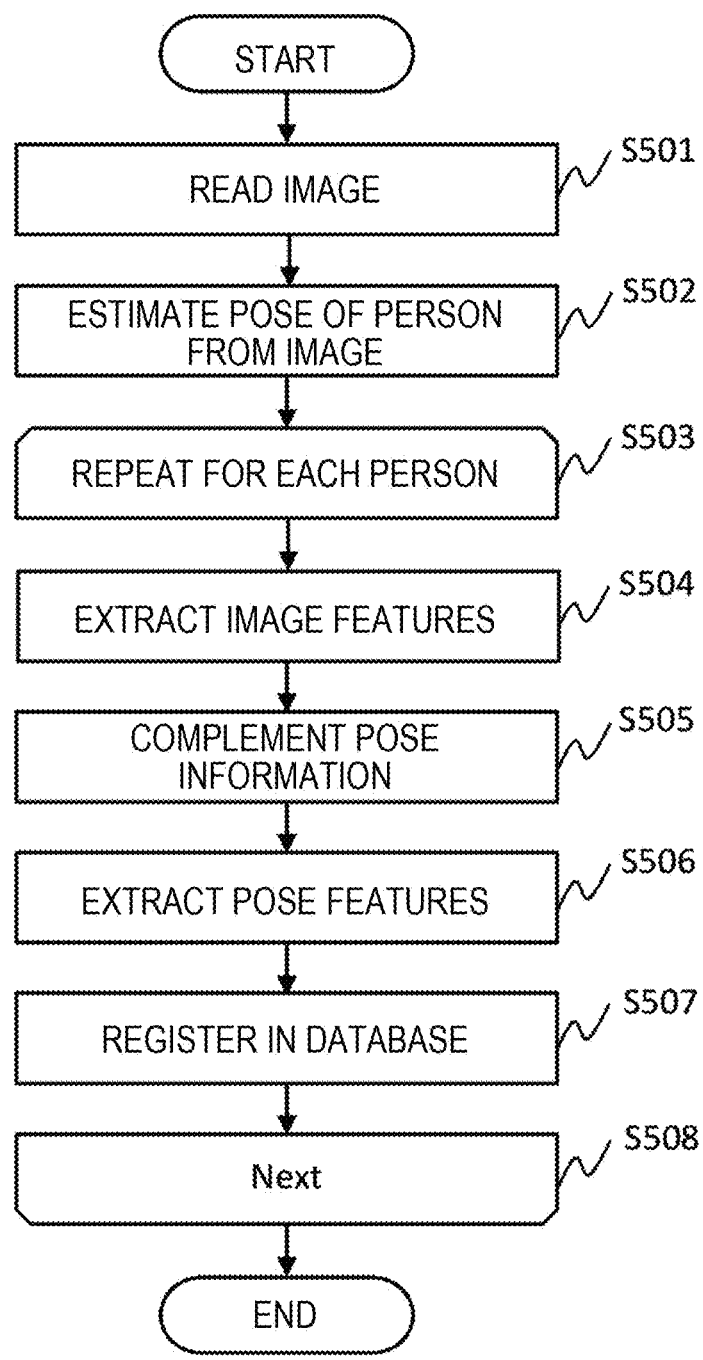
FIG. 5 is a flowchart of database registering processing according to the first embodiment.

FIG. 5 is a flowchart of database registering processing according to the present embodiment. Each step in FIG. 5 will be described below. A trigger of a data registering processing flow is a request for an image data group of a predetermined scene by a user. Details of the trigger will be described later with reference to FIG. 12 which is an overall sequence diagram of the registering processing and the retrieving processing.

In FIG. 5, the image inputting unit 105 obtains image data from the image storing apparatus 101 and converts the obtained image data into a format which can be used in the system as necessary (S501). For example, in a case where an input of the moving image is received, moving image decoding processing for decomposing the moving image data into frames (still image data format) corresponds to converting processing. Furthermore, in a case where retrieval is made by using the pose information, if the image is inclined relative to the ground or a lens is distorted, a retrieval accuracy may be deteriorated. Therefore, converting processing such as inclination correction and distortion correction is executed. The image features to retrieve an image by using the similarity of the entire image is extracted as necessary.

The pose estimating unit 106 detects a person region from the input image and estimates a pose of the person included in each region (S502). A known person detection algorithm can be used for the detecting processing. The pose estimating processing is executed by using the regression model which outputs coordinate values of the feature points from the input image. The known machine learning method such as deep learning and training data are prepared in advance, and the regression model learns the data in advance. A model which has learned the data at the time of executing the system is normally used as the regression model. As a result of step S502, the pose information including a set of feature points is obtained for each detected person. The feature point has data of coordinate values and reliability.

The image retrieving apparatus 104 executes steps S504 to S506 regarding each person detected in step S502 (S503).

The features extracting unit 107 extracts the image features from the region of the person obtained in step S502 (S504). For example, the region of the person can be obtained by extracting a region including all the feature points.

The features extracting unit 107 complements the feature points in a case where the pose information of the person obtained in step S502 lacks or in a case where the reliability of the feature points is extremely low (S505). In the pose estimating processing in step S502, in a case where an image is unclear and in a case where the person is hidden by a shielding object, the feature point may be lacked. The image retrieving apparatus 104 executes pose information complementing processing to extract the features which can be retrieved from a lacking person image. Details of the complementing processing will be described later with reference to FIGS. 6 and 7.

The features extracting unit 107 extracts the pose features from the complemented pose information obtained in step S505 (S506). The pose features are numerical vector reflecting the pose information, and can be calculated based on data in which coordinates of the feature points are arranged, the image features extracted from the image in which the feature points are visualized, and numerical data of a distance and an angle between the feature points.

The features extracting unit 107 registers the image information, the pose information of the object, the image features, and the pose features obtained in the above processing in the image database 108 in association with each other (S507). At this time, regarding the features, data clustering processing to realize high-speed retrieval may be executed.

When new data is continuously recorded in the image storing apparatus 101, for example, in a case of a monitoring camera, after storage of new data is waited, the procedure returns to step S501, and the registering processing is repeated.

Figure 6:
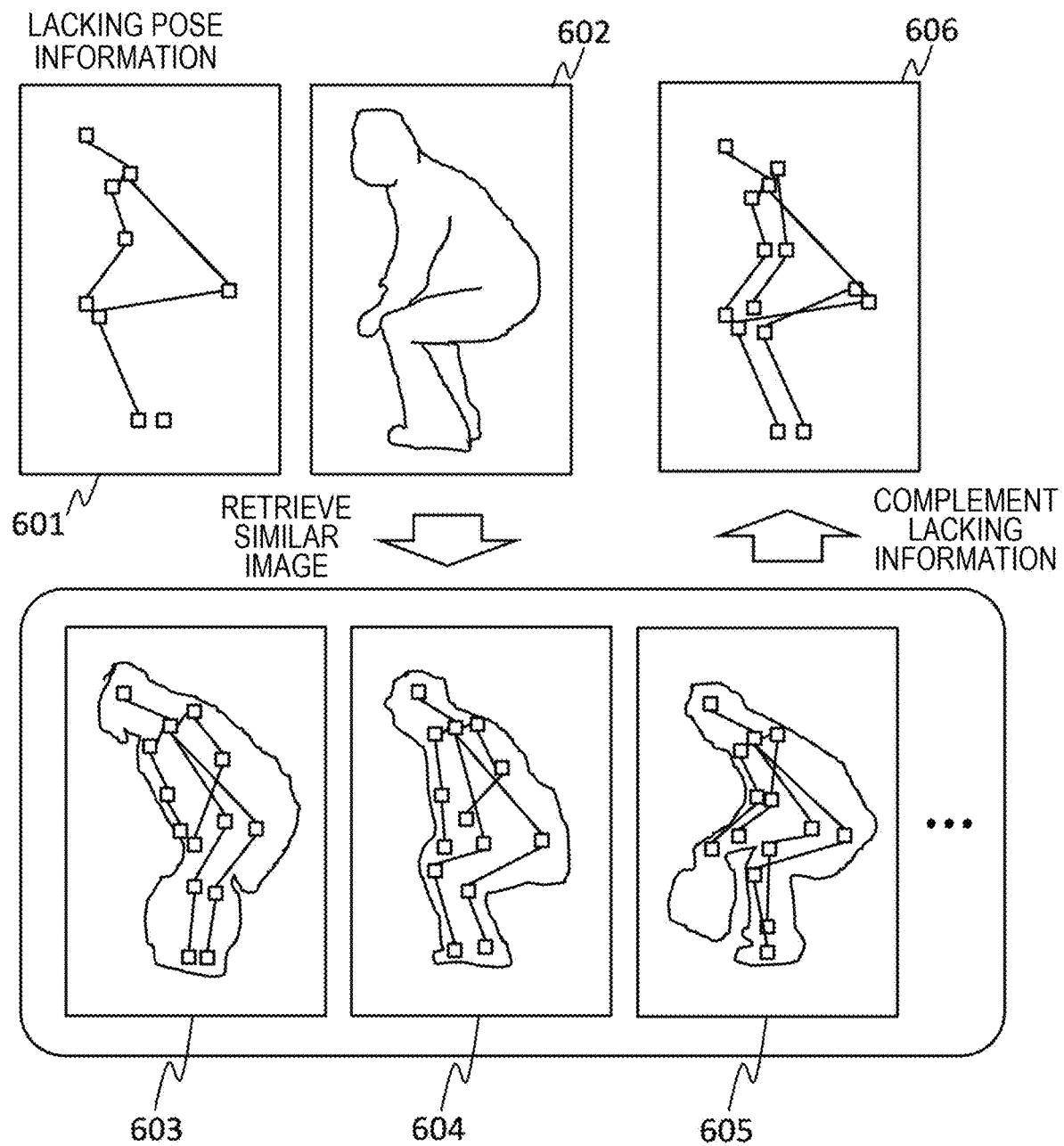
FIG. 6 is a diagram for explaining complementing processing of lacking pose information according to the first embodiment.

FIG. 6 is a diagram for explaining the complementing processing of lacking pose information according to the present embodiment. In the pose estimating processing by the image recognition, there is a case where all the feature points cannot be recognized. In FIG. 6, for example, in a case of a person image 602 who is sitting with the hand on the knee, as in pose information 601, the feature points obtained by the pose estimating processing lack. Therefore, the image retrieving apparatus 104 obtains similar images (603, 604, and 605) from the image database 108 and complements position information on lacking feature points from the pose information of the similar images (pose information 606). For calculation of the degree of similarity, for example, image features of a person image may be used, or pose features calculated from feature points of parts other than defect parts may be used. In addition, by narrowing a range of images by a time, a place, a position in the image, an attribute of the person, a tracking ID, and the like, appropriate similar images can be obtained. The retrieval target may be a past image which has been registered in the image database 108 and may be a template of a typical pose which has been previously input at the time of system design. In a case where the coordinates can be easily estimated from adjacent feature points with a rule base, the complementing processing may be executed without retrieving images.

Figure 7:
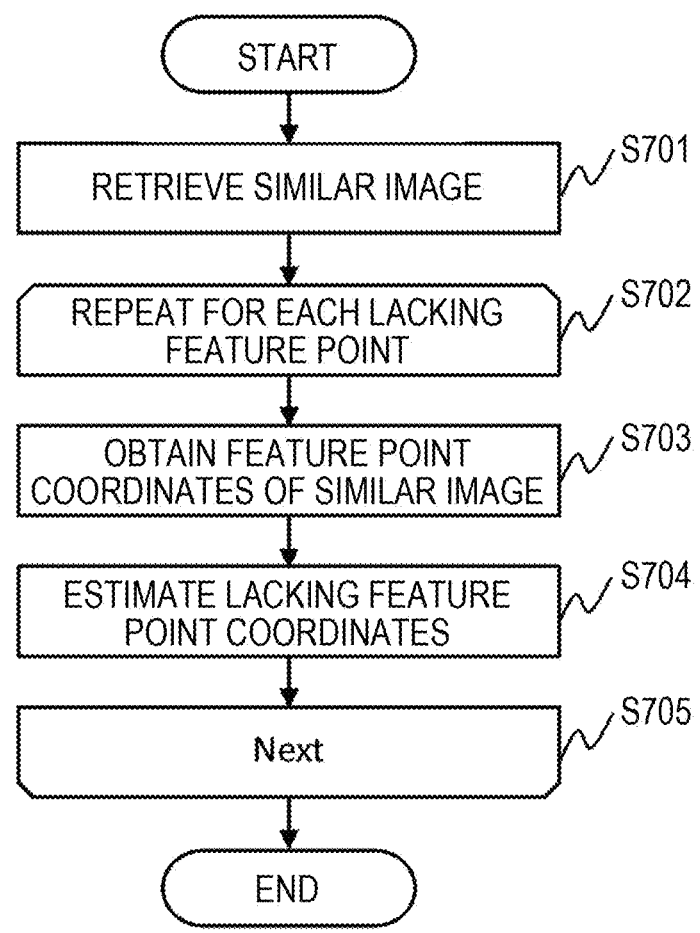
FIG. 7 is a flowchart of pose information complementing processing according to the first embodiment.

FIG. 7 is a flowchart of complementing processing of lacking information according to the present embodiment. The processing flow in FIG. 7 corresponds to step S505 in the processing flow in FIG. 5. In FIG. 7, the features extracting unit 107 retrieves similar images from the image database 108 using features of a person image to be processed as a query (S701)

The features extracting unit 107 executes steps S703 and S704 regarding the lacking feature point (S702). As a result of the pose estimating processing, the lacking feature point is a feature point of which coordinates cannot be estimated or a feature point of which coordinates can be estimated and the reliability is lower than a predetermined value.

The features extracting unit 107 obtains the coordinates and the reliability of the corresponding feature points of the respective similar images obtained in step S701 (S703).

The features extracting unit 107 estimates the coordinates of the lacking feature point from the set of coordinates obtained in step S703 (S704). The coordinates of the lacking feature point can be calculated, for example, based on an average value and a median value of the coordinate values. The coordinates of the lacking feature point may be calculated with weighting according to the degree of similarity.

When the features extracting unit 107 has completed to complement all the lacking features, the processing is terminated (S705).

The registering processing of the image retrieving apparatus 104 according to the present embodiment has been described above. The retrieving processing of the image retrieving apparatus 104 according to the present embodiment will be described below with reference to FIGS. 8 and 9.

Figure 8:
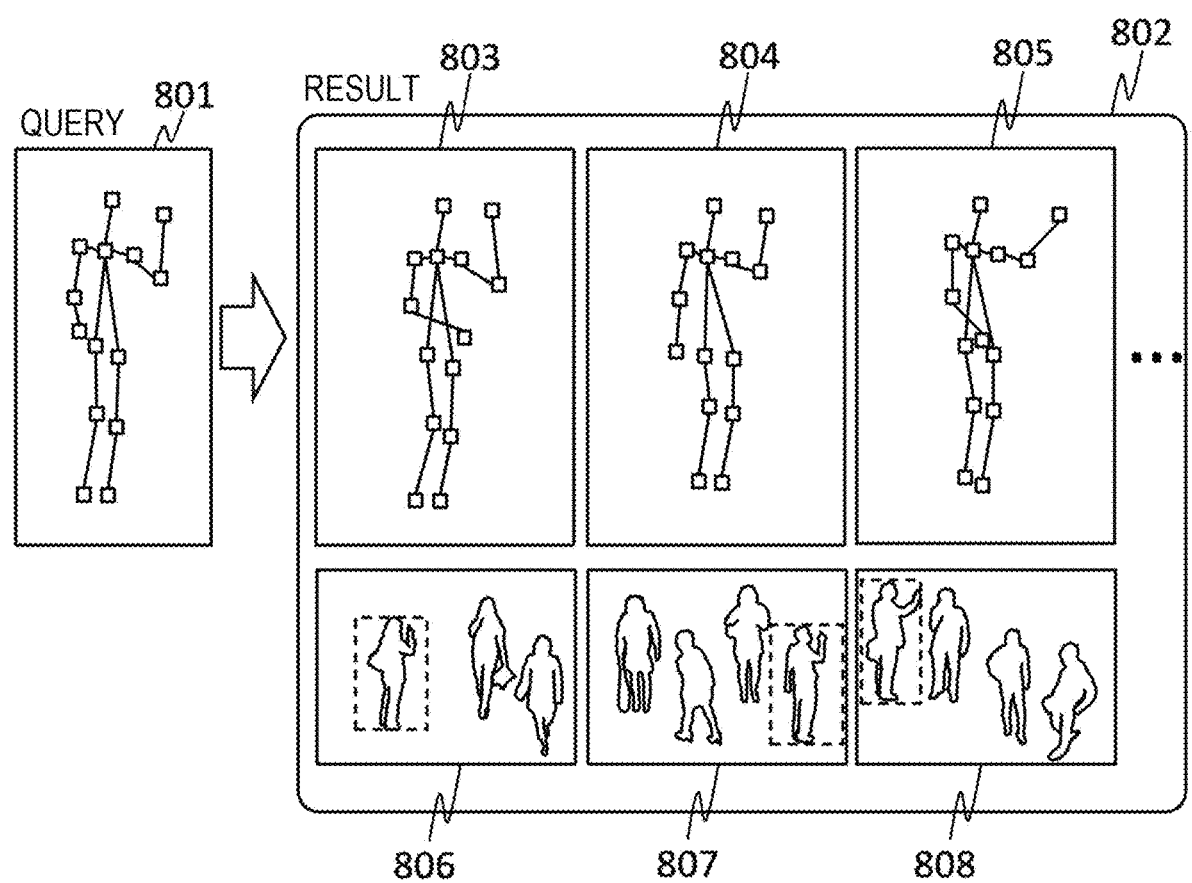
FIG. 8 is a diagram for explaining image retrieval using the pose information according to the first embodiment.

The image retrieving apparatus 104 can retrieve images including a person in a similar pose information by using the pose information input by the user as a query. FIG. 8 is an example of input/output of the retrieving processing. In FIG.

8, when the user inputs pose information 801 as a query, the image retrieving apparatus 104 outputs a retrieval result 802. The retrieval result is a list of a plurality of pieces of personal data (803, 804, and 805) and is sorted, for example, in order of the degree of similarity and output. In addition, image data corresponding to each personal data may be output. Pieces of image data 806, 807, and 808 in FIG. 8 are respectively original images from which the personal data 803, 804, and 805 is extracted.

Figure 9:
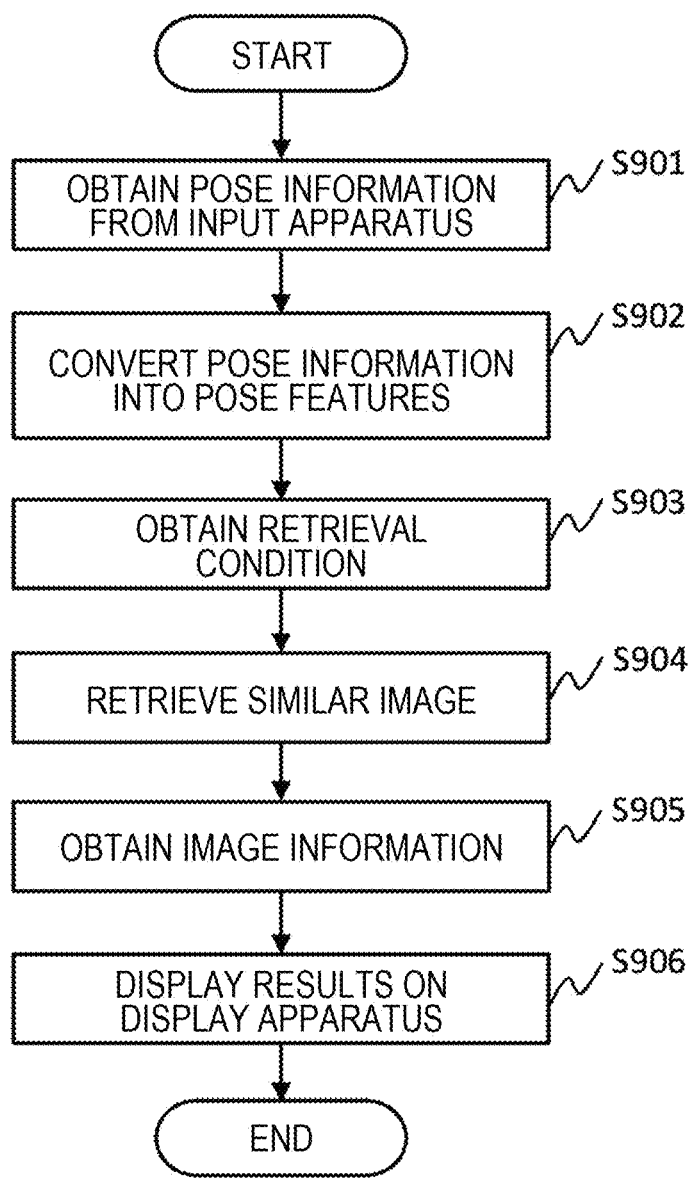
FIG. 9 is a flowchart of image retrieving processing according to the first embodiment.

FIG. 9 is a flowchart of image retrieving processing according to the present embodiment. In FIG. 9, the pose inputting unit 109 receives the pose information input by the user (S901). The pose information is a set of feature points, and the feature point is indicated by coordinate values. For example, the user inputs the coordinate value by operating the feature point displayed on the display apparatus 103. Alternatively, the coordinate value may be directly input from a dedicated device and may be converted into the pose information by processing voice and texts.

The query generating unit 110 converts the pose information input in step S901 into the pose features (S902). The converting processing is executed by means equivalent to the processing at the time of registration (step S506 in FIG. 5).

Furthermore, the query generating unit 110 obtains a retrieval condition other than the pose information as necessary (S903). For example, it is possible to obtain the image features, the attribute of the person, the time, and the place as a condition.

The image retrieving unit 111 retrieves similar images from the image database 108 according to the pose features obtained in step S902 and the retrieval condition obtained in step S903 (S904). In the retrieving processing, as described with reference to FIG. 1, a square Euclidean distance between the features of the person to be compared which is registered in the database and the features of the query are calculated, and the predetermined number of pieces of data is obtained in ascending order of distance. When the retrieval condition is given, the person who matches the retrieval condition is compared. When the image features are given, the distance of the image features and the distance of the pose features are integrated, rearranged, and output. As an integration method of the distances, two distances may be simply added, and a distance may be normalized or weighted.

The image retrieving unit 111 obtains original image information from which the person has been detected from the image database 108 according to the retrieval result obtained in step S904 (S905).

The retrieval result displaying unit 112 displays a retrieval result screen generated based on the retrieval result obtained in step S904 and the image information obtained in step S905 on the display apparatus 103 and terminates the processing (S906).

Figure 10:
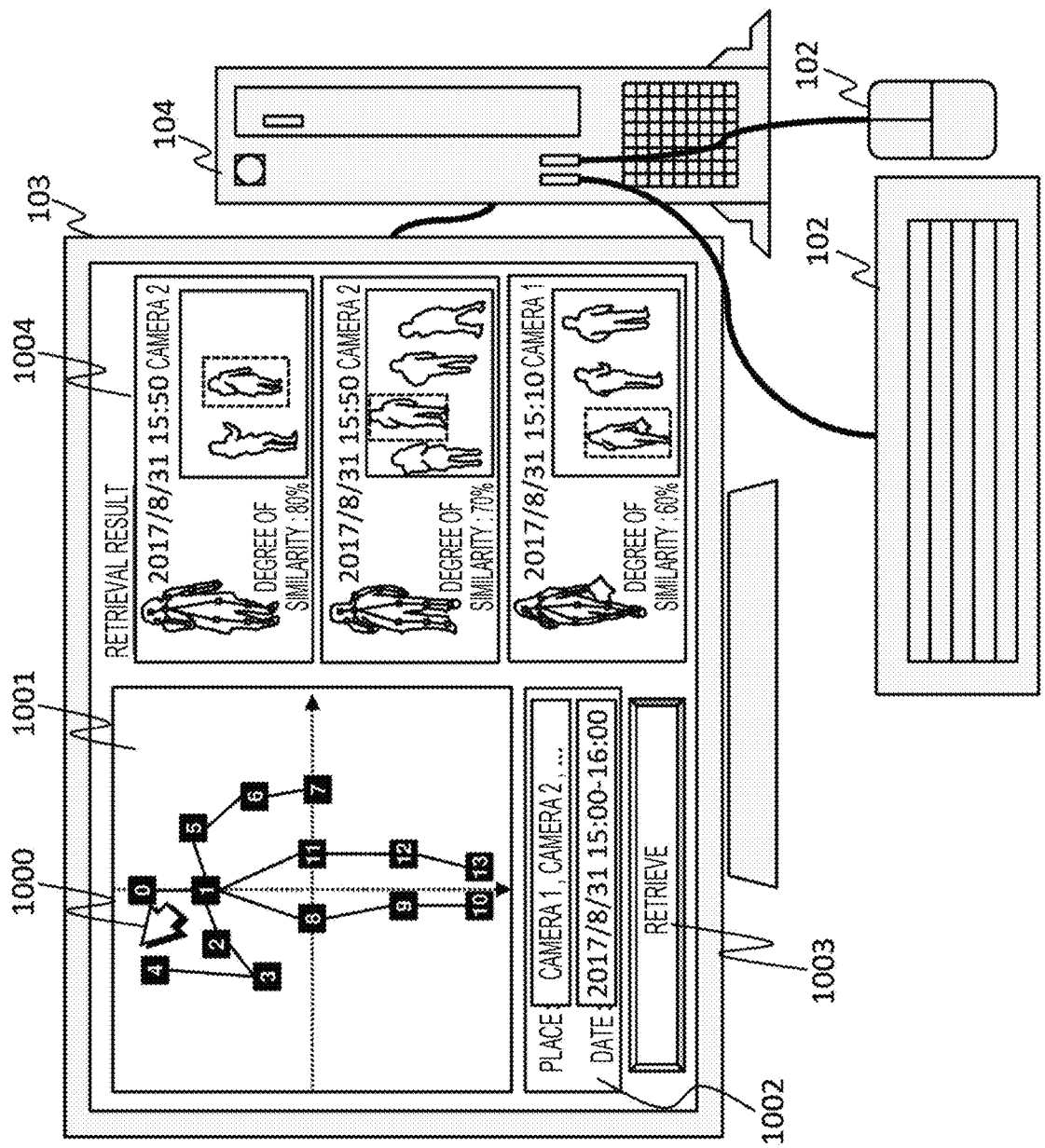
FIG. 10 is a diagram of a retrieval screen using the pose information according to the first embodiment.
Figure 11:
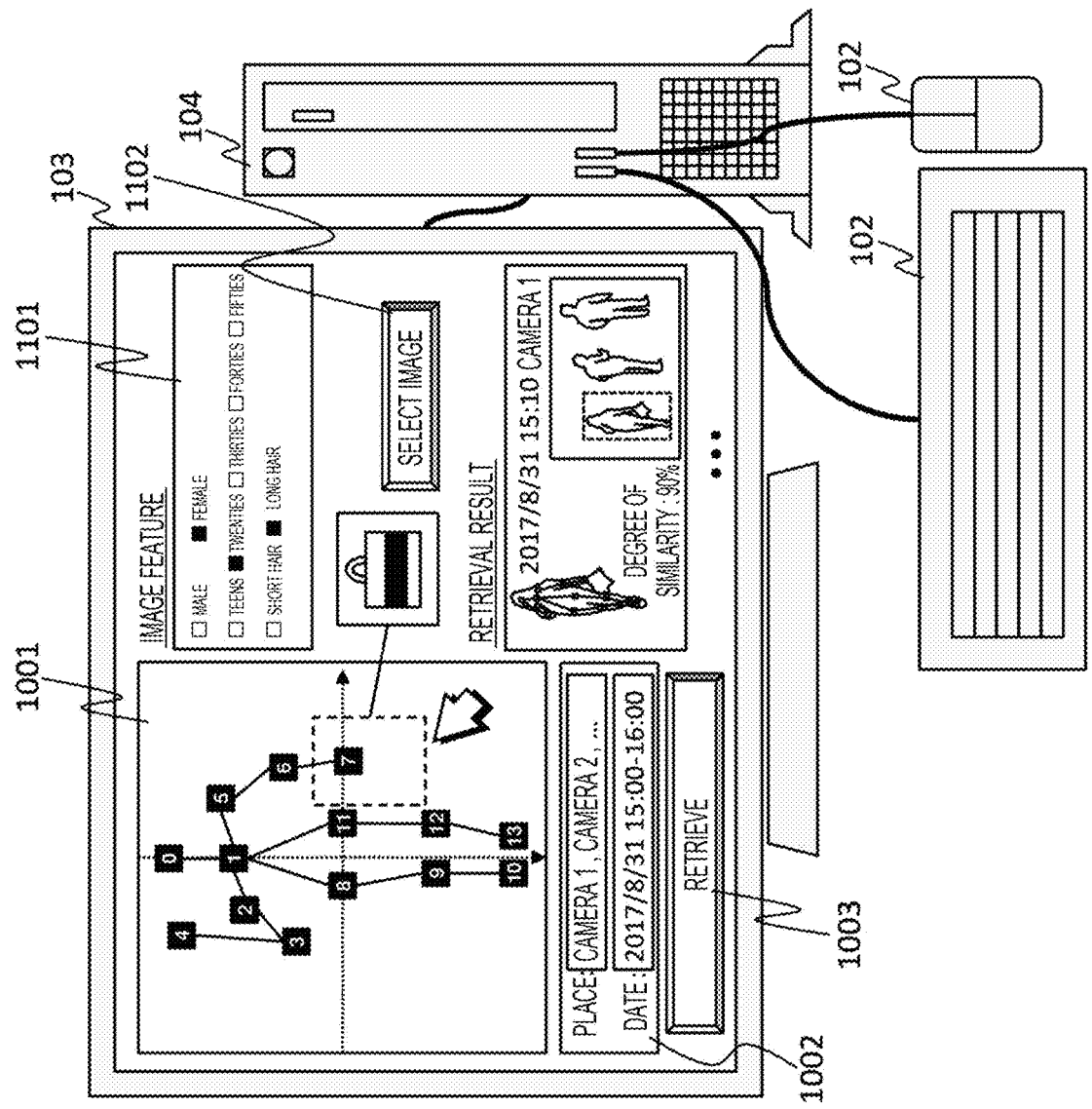
FIG. 11 is a diagram of a retrieval screen using the pose information and image features according to the first embodiment.

FIG. 10 is a diagram of an exemplary configuration of an operation screen to execute the image retrieval by using the image retrieving apparatus 104 according to the present embodiment. Similarly, FIG. 11 illustrates an operation screen to execute image retrieval by adding the attribute and the image features as conditions. First, FIG. 10 will be described.

In FIG. 10, the operation screen is presented to the user on the display apparatus 103. The user operates a cursor 1000 displayed on the screen by using the input apparatus 102 (keyboard, mouse, and the like) to issue an instruction to execute the processing to the image retrieving apparatus 104. The example in FIG. 10 is a stationary-type operation terminal. However, as long as the device can input and display the information, various forms can be used. For example, as a smartphone or a tablet, a touch operation may be used. In addition, it is possible to use a mount-head-type display and a glass-shaped device which can display information as a display apparatus and use an input apparatus which receives voice inputs and gestures. An input from a dedicated device to input the pose information may be reflected on the screen.

The operation screen includes a pose input region 1001, a retrieval condition input region 1002, a retrieval button 1003, and a retrieval result display region 1004.

Information displayed in the pose input region 1001 is output to the display apparatus 103 by the pose inputting unit 109. Information displayed in the retrieval result display region 1004 is output to the display apparatus 103 by the retrieval result displaying unit 112.

The user determines the coordinates of the feature points by dragging and dropping feature points of basic pose displayed in the pose input region 1001 (corresponding to step S901). The feature points in FIG. 10 are, for example, 0: head, 1: neck, 2: right shoulder, 3: right elbow, 4: right wrist, 5: left shoulder, 6: left elbow, 7: left wrist, 8: right waist, 9: right knee, 10: right ankle, 11: left waist, 12: left knee, 13: left ankle. When the pose information is input, the feature points may be independently moved, and the plurality of feature points may be moved in conjunction with each other in consideration of connection relations. Furthermore, control points and the like other than the feature points may be added.

After inputting the pose information, the user input the retrieval conditions such as the place and the time to the retrieval condition input region 1002 (corresponding to step S903).

When the user clicks the retrieval button 1003, the retrieval is executed (corresponding to step S904). If there is no problem regarding an operation speed, without expressly pressing the retrieval button, the operation may be changed to automatically execute the retrieval at the time when the pose information and the retrieval condition are changed.

The retrieval result is converted into a screen including appropriate information by the retrieval result displaying unit 112 and displayed in the retrieval result display region 1004 (corresponding to step S906).

FIG. 11 is an example of an operation screen to specify the attribute and the image features of the image as the retrieval conditions according to the present embodiment. In FIG. 11, an attribute input region 1101 and an image selection button 1102 are added to the screen in FIG. 10.

In FIG. 11, by clicking a check box of an attribute displayed in the attribute input region 1101, the user adds the attribute of the corresponding person to the retrieval condition. Furthermore, by clicking the image selection button and selecting an arbitrary image stored in the image storing apparatus 101, image features extracted from the selected image can be added to the retrieval conditions. The selection operation of the image may be made on an interface for adding an image in the screen by dragging and dropping the image. At this time, image features of a whole body of a person may be compared by inputting a person image, and only image features around specified feature point may be compared by specifying feature point in the pose input region 1001. For example, FIG. 11 illustrates a state in which a woman in her twenties with long hair who has a bag on her left hand and raises her right hand is retrieved.

Figure 12:
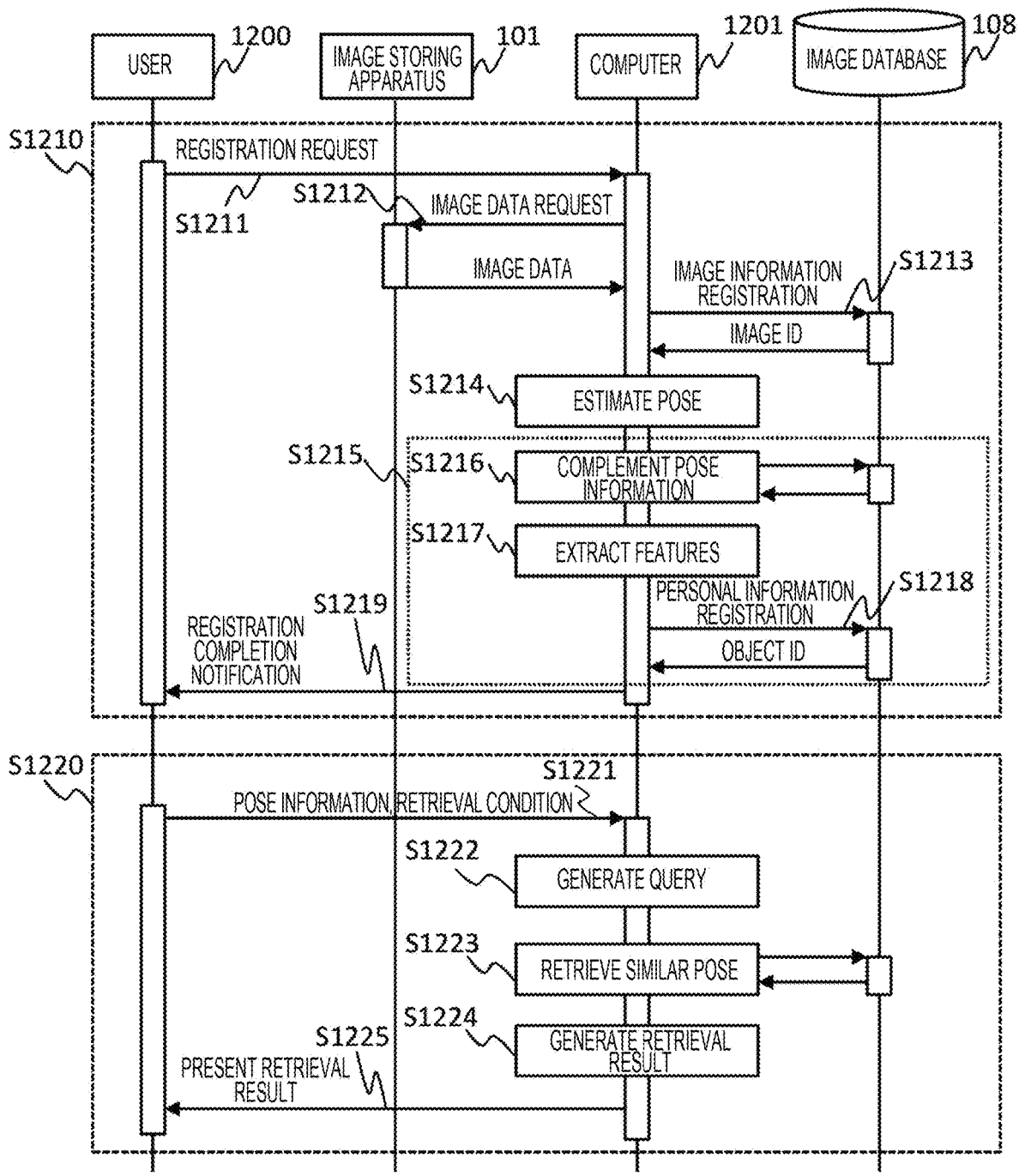
FIG. 12 is a sequence diagram of processing of an entire system according to the first embodiment.

FIG. 12 is a sequence diagram for explaining an example of processing of the image retrieving system 100 according to the present embodiment. Specifically, FIG. 12 illustrates a processing sequence between a user 1200, the image storing apparatus 101, a computer 1201, and the image database 108 in image registration and image retrieving processing of the image retrieving system 100 described above. The computer 1201 implements the image retrieving apparatus 104.

In FIG. 12, S1210 indicates the registering processing, and S1220 indicates the retrieving processing. The registering processing S1210 includes processing indicated in steps S1211 to S1219. When the user 1200 issues a registration request (S1211), the registering processing starts. A specific use case of S1211 will be described later. The registering processing corresponds to the processing described in FIG. 5, and the registering processing is repeated for the number of files and a predetermined time specified by the user. The computer 1201 issues an image data obtaining request to the image storing apparatus 101 and obtains image data from the image storing apparatus 101 (S1212). The computer 1201 registers the obtained image information in the image database 108 (S1213), estimates a pose of a person in the image (S1214), and executes the series of processing for each person (S1215). In the series of processing, the pose information is complemented (S1216), the features are extracted (S1217), and the personal information is registered in the image database 108 (S1218). When all the registering processing has been completed, the registration completion is notified to the user (S1219).

The retrieving processing S1220 includes processing indicated in steps S1221 to S1225. When the user 1200 inputs the pose information and the retrieval condition to the computer 1201 (S1221), the computer 1201 generates a query by converting the input pose information and image into features (S1222), and obtains similar images from the image database 108 (S1223). The computer 1201 generates a screen including necessary information (S1224) and presents the retrieval result to the user 1200 (S1225).

Here, positioning of S1211 in each use case will be described. For example, when a case is assumed in which a police official retrieves a specific suspicious person in a monitoring camera image in a specific station, S1211 corresponds to processing for requesting an image data group which may include the suspicious person to a station server corresponding to the image storing apparatus 101. When a case is assumed in which a user such as an employee of a large commercial facility management company desires to find an abnormal behavior in a monitoring camera image in the facility, S1211 corresponds to processing for requesting an image data group which may include a stray child or a lost item to a server in the facility corresponding to the image storing apparatus 101. In S1211, the user can narrow down parameters of the data group to be obtained by specifying a specific data and time.

In FIG. 12, after the registering processing S1210 has been completed, the retrieving processing S1220 is executed. However, the registering processing and the retrieving processing may be concurrently executed. For example, the registering processing is constantly executed on the images which are continuously input from the monitoring camera, and the user can retrieve a person from a monitoring image by executing the retrieving processing at any time. In addition, the imaged image may be managed in association with and an ID of a monitoring camera which has imaged the image. Accordingly, a time when the person who has found by retrieval is imaged and an imaging position can be easily specified, and a tracing efficiency of an object to be retrieved can be improved.

As described above, according to the image retrieving system in the present embodiment, in various use cases, it is possible to retrieve an image according to a retrieval intention of the user.

Second Embodiment

With respect to a monitoring camera image including a large number of people, there is a need for utilizing a video to improve safety and convenience, for example, for congestion reduction and marketing analysis. On the other hand, from the viewpoint of privacy protection, and the like, there is a case where it is difficult to release an original image. In the present embodiment, a method of applying an image retrieving apparatus 104 to image edition will be described.

Figure 13:
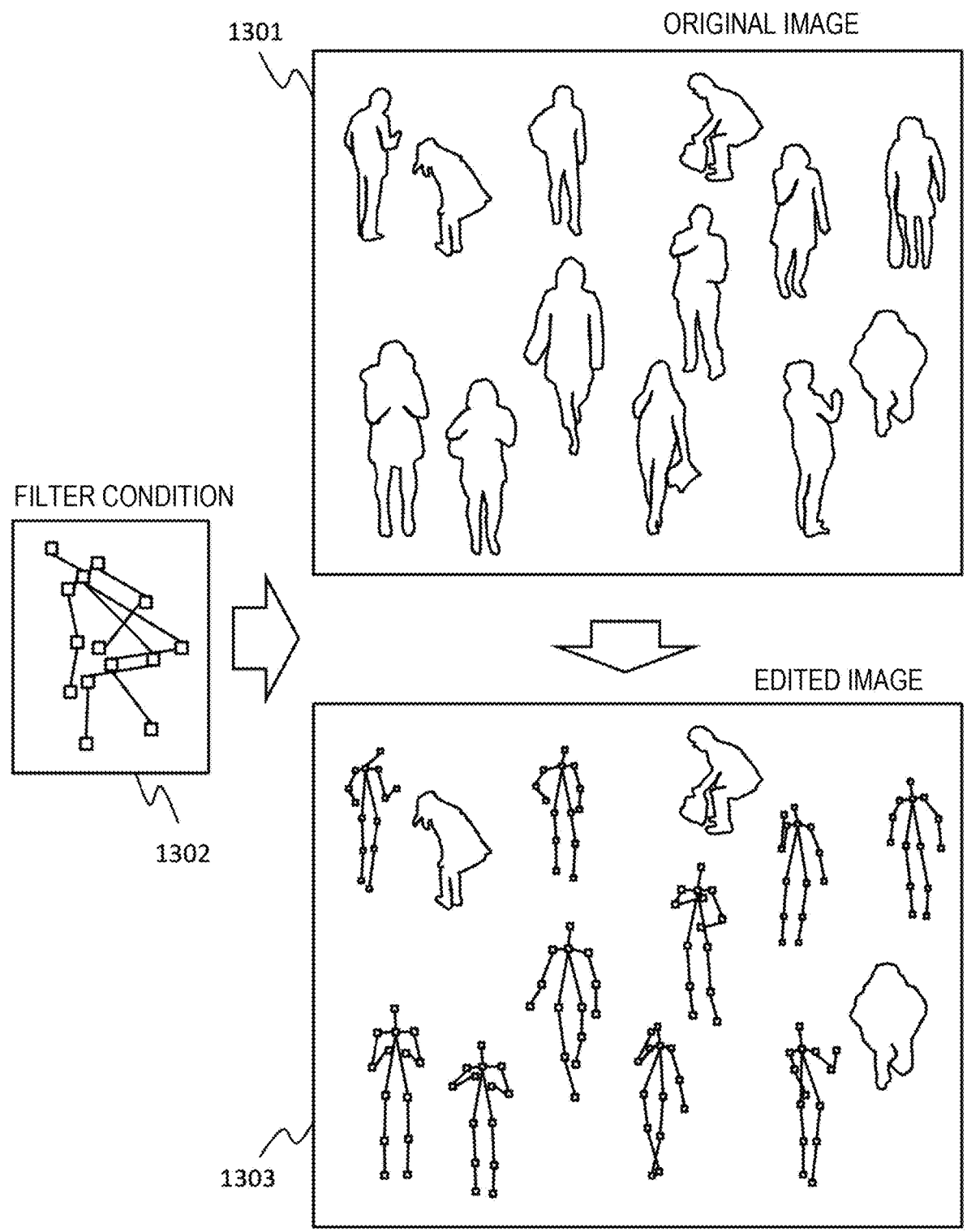
FIG. 13 is a diagram for explaining image edition based on pose information according to a second embodiment.

FIG. 13 is a diagram illustrating image edition using pose information according to the present embodiment. In FIG. 13, by executing pose estimating processing on an input original image 1301, a position and a pose of a person in a screen can be obtained. On the other hand, an edited image 1303 can be generated in which a specific pose is used as a filter condition (1302), only a person in similar pose is displayed as an actual image, and other people are indicated by only pose information. The user can check a person to be confirmed in a pose specified in the filter condition (for example, squatting person) by looking at the actual image and can check other people by grasping a state of an entire scene based on the visualized pose information. Various methods of displaying the person can be used according to use conditions of the video. For example, in a case where the disclosure of the actual image is totally prohibited, only pose information regarding the person who matches the filter condition is displayed in a design different from the others. In addition, only a part from which an individual can be specified (head) may be displayed in a blurred state.

Figure 14:
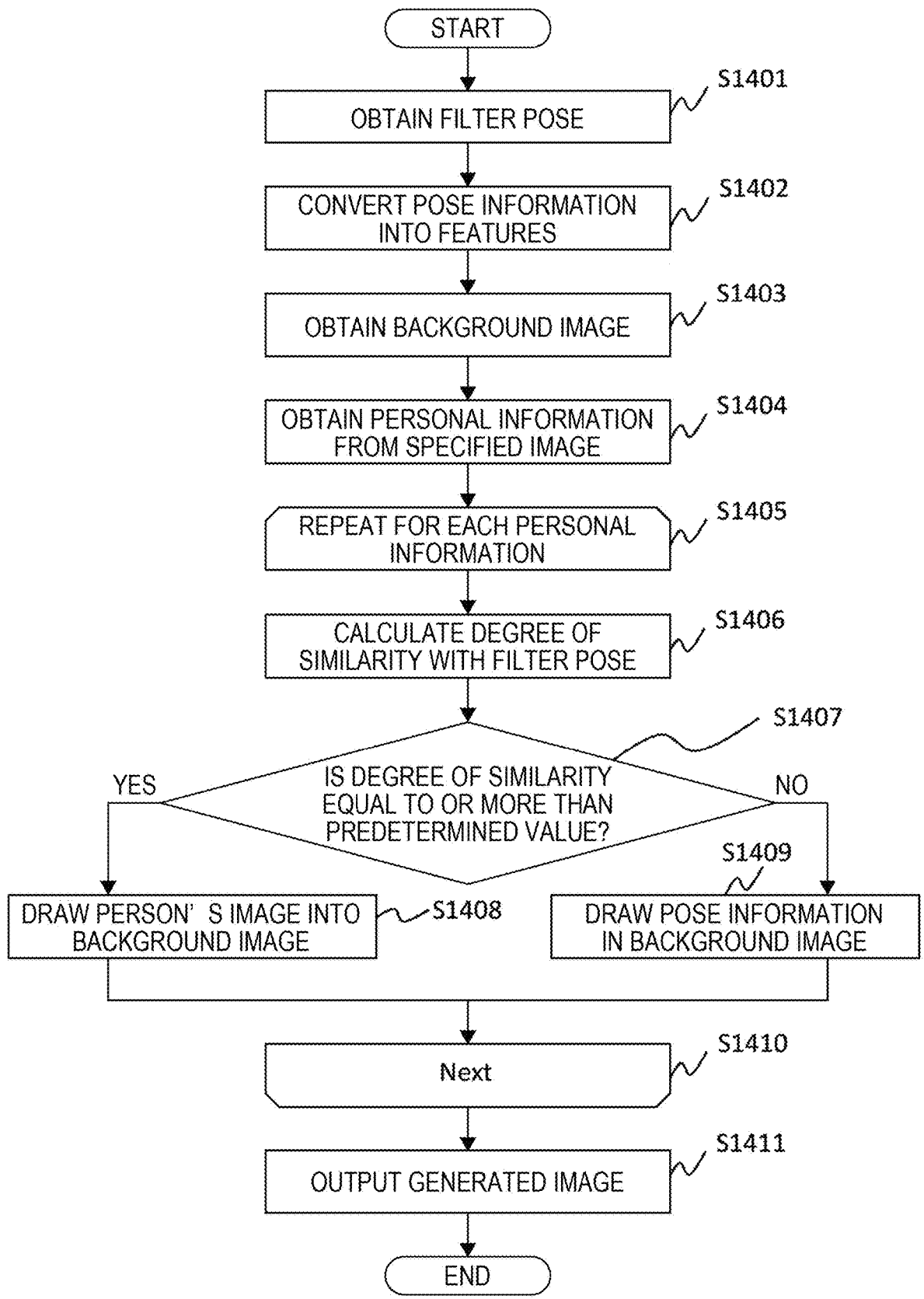
FIG. 14 is a flowchart of image editing processing based on the pose information according to the second embodiment.

FIG. 14 is a flowchart of processing of image edition using the pose information according to the present embodiment. It is assumed that an image to be edited has been registered in an image database 108 in advance. In FIG. 14, a pose inputting unit 109 obtains the pose information used as a filter condition from an input apparatus 102 (S1401). A query generating unit 110 converts the pose information obtained in step S1401 into pose features (S1402). A retrieval result displaying unit 112 obtains an image with no person from the image database 108 as a background image (S1403). Here, an image at the place same as the place of an image to be edited is used as a retrieval condition for obtaining the image as a background image. In a case where the image with no person cannot be found, a background image is generated by synthesizing a plurality of images. An image retrieving unit 111 obtains pose features of the person in the image to be edited from the image database 108 (S1404).

An image retrieving apparatus 104 executes steps S1406 to S1409 with respect to each person obtained in step S1402 (S1405). The image retrieving unit 111 calculates the degree of similarity between the pose features for filter obtained in step S1402 and pose features of a target person (S1406). The image retrieving apparatus 104 executes step S1408 when the degree of similarity obtained in step S1406 is equal to or more than a predetermined value and executes step S1409 otherwise (S1407). The retrieval result displaying unit 112 synthesizes a person image with the background image obtained in step S1403 (S1408). The retrieval result displaying unit 112 visualizes and draws the pose information in the background image obtained in step S1403 (S1409). When drawing of the people in all the images has been completed, the retrieval result displaying unit 112 displays an edited image on the display apparatus 103 and terminates the processing (S1411).

According to the present embodiment, by using the image database 108 in which the image information and the pose information are stored in a retrievable state, a system which automatically edits the input image can be constructed.

Third Embodiment

The image retrieving apparatus 104 according to the first embodiment can retrieve images including similar poses. However, if imaged directions are different from each other even when the poses are the same, the images have different coordinates of the feature points on the screen. Therefore, the image cannot be retrieved. In the present embodiment, a method of retrieving poses obtained respectively from different directions by using a plurality of queries will be described.

Figure 15:
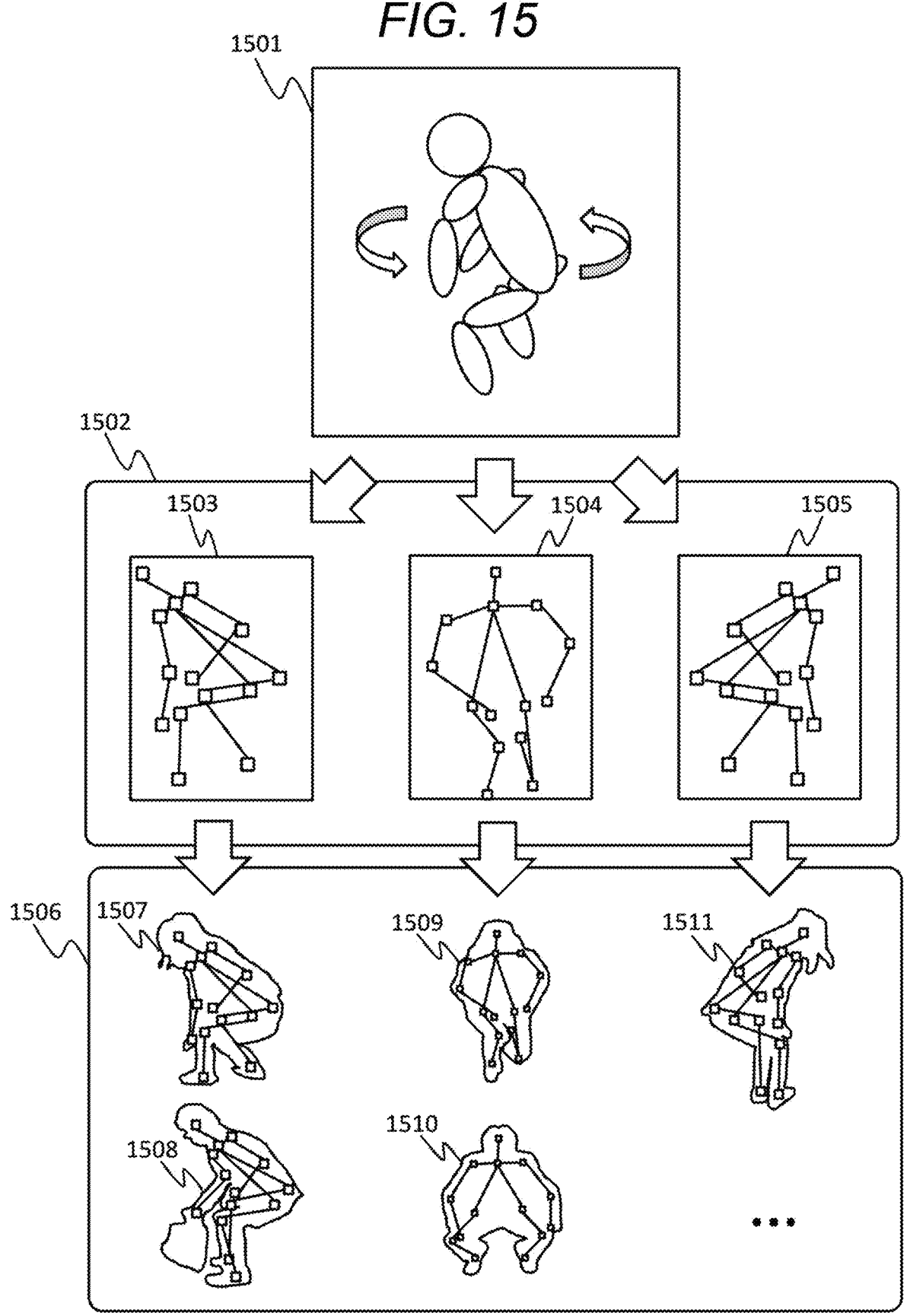
FIG. 15 is a diagram for explaining retrieval using a plurality of queries according to a third embodiment.

FIG. 15 is an explanatory diagram indicating retrieval of similar poses using a plurality of queries according to the present embodiment. As illustrated in FIG. 15, pose information is input by an interface having three-dimensional coordinate information in a pose inputting unit 109 (1501). By changing a point of view in the three-dimensional space, a plurality of pieces of pose information in a case where the image is projected on a plane can be obtained (1502). The obtained pose information is converted into a query, and similar images corresponding to each query are retrieved from an image database 108 (1506). In FIG. 15, similar images 1507 and 1508 corresponding to a query 1503, similar images 1509 and 1510 corresponding to a query 1504 and a similar image 1511 corresponding to a query 1505 are retrieved, and images including similar poses in different directions are obtained.

Figure 16:
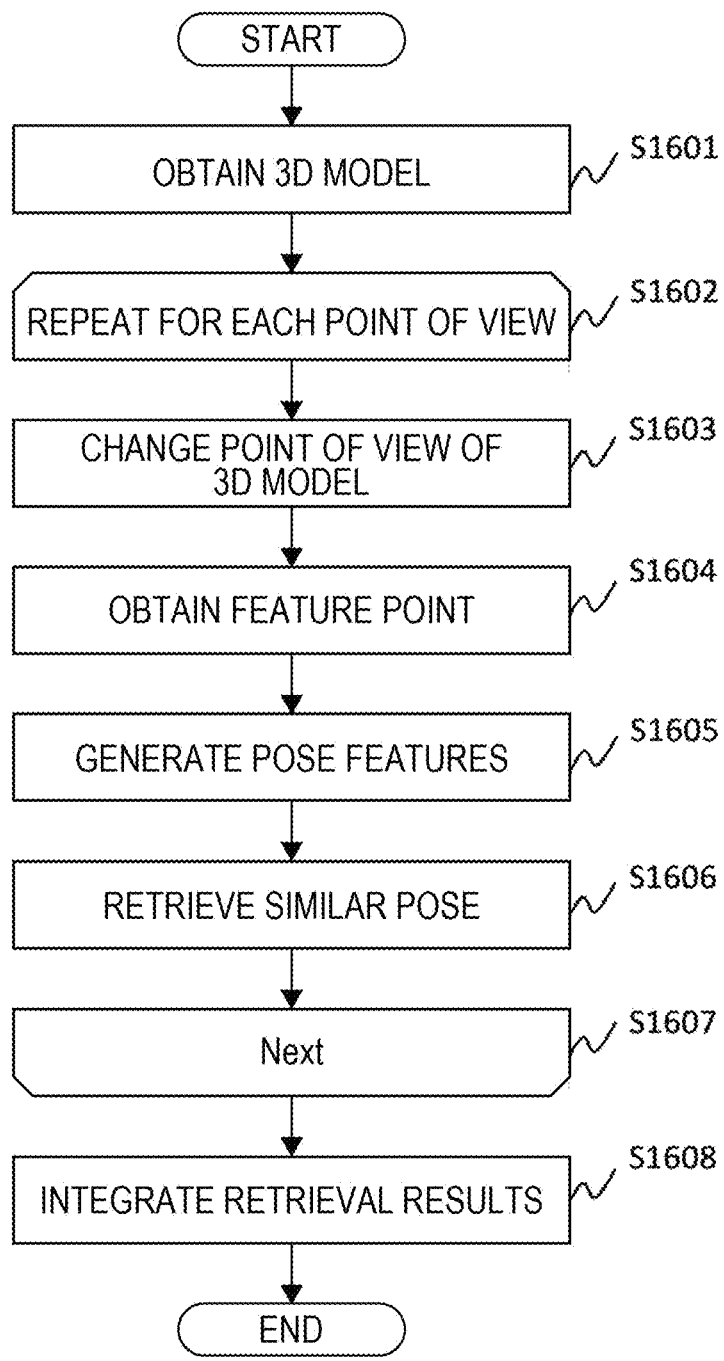
FIG. 16 is a flowchart of retrieving processing using the plurality of queries according to the third embodiment.

FIG. 16 is a flowchart of similar pose retrieving processing using a plurality queries according to the present embodiment. In FIG. 16, the pose inputting unit 109 obtains a 3D model input by a user through an input apparatus 102 (S1601). The image retrieving apparatus 104 executes steps S1603 to S1606 with respect to a plurality of points of view (S1602).

A query generating unit 110 changes the point of view of the 3D model (S1603). Furthermore, the query generating unit 110 obtains feature point coordinates in a case where an image is projected on the plane and obtains pose information (S1604). In addition, the query generating unit 110 generates pose features from the pose information obtained in step S1604 (S1605).

The image retrieving unit 111 obtains similar images from the image database 108 using the features generated in step S1605 as a query (S1606). A retrieval result displaying unit 112 collectively displays all the retrieval results obtained in step S1606 from each point of view on the display apparatus 103 and terminates the processing (S1608).

According to the present embodiment, by using the plurality of queries, the poses obtained from different directions can be retrieved.

Fourth Embodiment

The image retrieving apparatus 104 according to the first embodiment can retrieve still images including similar poses by using the features generated from the pose information. However, even when the poses at the time of imaging the still images are the same, behaviors may be different. For example, since pose information 1703 and pose information 1713 in FIG. 17 similarly raise right hands, both pose information is retrieved with a high degree of similarity. However, looking at the pose information as continuous images, it is found that 1701 to 1703 indicates an action of "raising and waving right hand", and 1711 to 1713 indicates an action of "confirming a cell phone and making a call". In order to distinguish these actions from each other, for example, it is possible to apply the multiple query retrieval according to the third embodiment, retrieve continuous frames at a plurality of times, and integrate the results. On the other hand, in the present embodiment, a method of storing a trajectory of each feature point and retrieving an image according to trajectory information such as 1704 and 1714 in FIG. 17 will be described.

Figure 18:
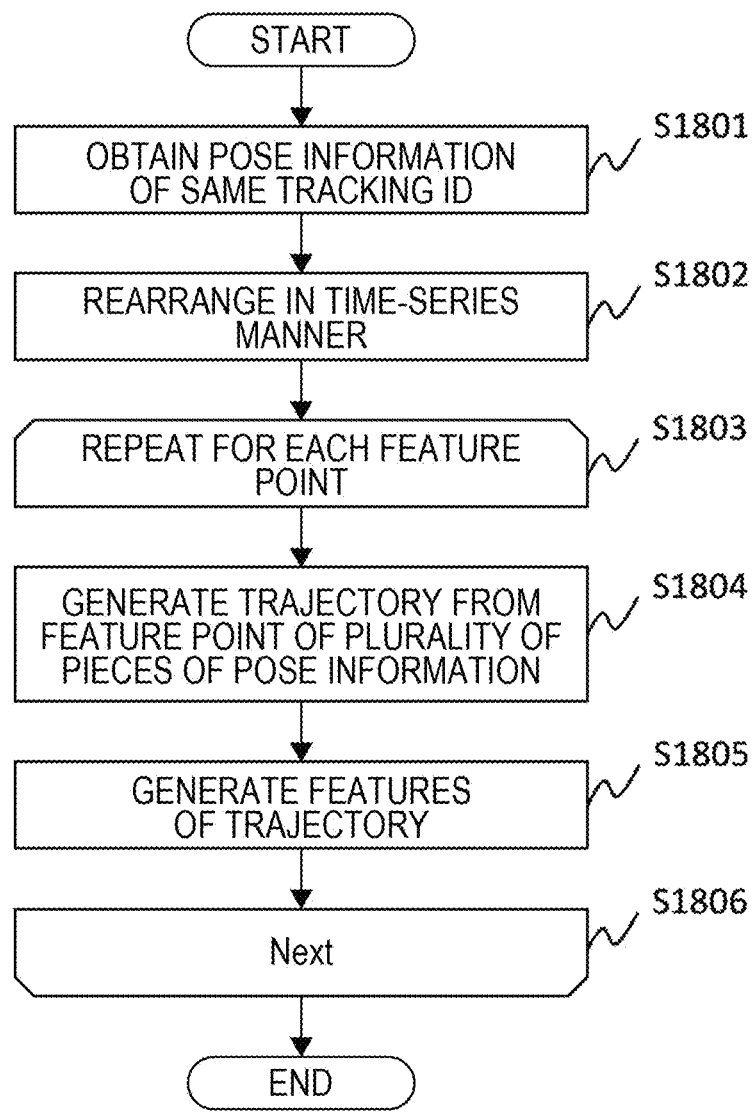
FIG. 18 is a flowchart of motion recognizing processing using the trajectory according to the fourth embodiment.

FIG. 18 is a flowchart of pose features extracting processing using trajectories of feature points according to the present embodiment. In FIG. 18, a features extracting unit 107 obtains pose information having the same tracking ID 318 illustrated in FIG. 3 in a certain time section (S1801). Furthermore, the features extracting unit 107 rearranges the pose information in time series (S1802).

The features extracting unit 107 executes steps S1804 and S1805 for each feature point (S1803). The features extracting unit 107 extracts coordinates of the corresponding feature points from the plurality of pieces of pose information arranged in time series and generates trajectories (S1804). Furthermore, the features extracting unit 107 calculates features of the trajectory from the trajectory generated in step S1804 (S1805). The features of the trajectory are numerical data to find similar trajectories. For example, a trajectory is drawn in an image and image features of the trajectory may be extracted, and vector data obtained by quantifying a movement amount and a direction per unit time may be used. The features of the trajectory may be added to the person table 310 as the features of the personal information, and a new table for managing tracking information may be prepared in an image database 108.

Retrieval using the trajectory is similar to the content illustrated in FIG. 9 except that the features to be used are the features based on the trajectory. Therefore, the description thereof will be omitted.

In the present embodiment, the trajectory features are used for retrieval. However, it is possible to collect features of a typical trajectory and makes a trajectory identifier learn the collected features by machine learning. The features extracting unit 107 identifies the operation by using the operation identifier which has learned the features and may register the operation in the image database 108 in association with personal information.

As described above, according to the present embodiment, it is possible to perform retrieval with a high degree of similarity by performing the retrieval using the trajectory information.

Fifth Embodiment

The image retrieving apparatus 104 according to the first embodiment has retrieved the image in consideration of the pose of the single person in the screen. In the present embodiment, a method of retrieving similar scenes using pose information on the plurality of persons in the screen will be described.

Figure 19:
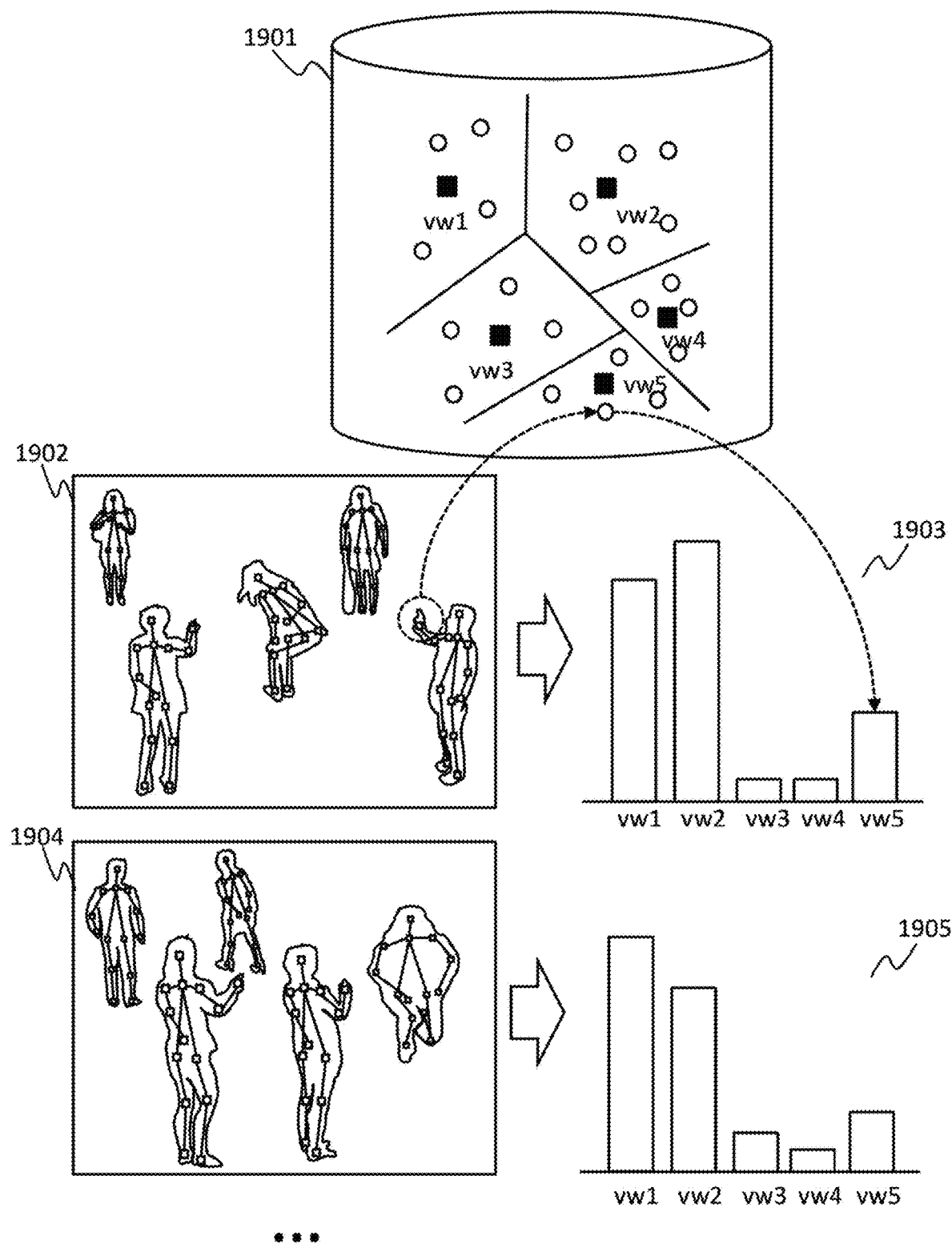
FIG. 19 is a diagram for explaining features extraction from an entire image using pose information according to a fifth embodiment.

FIG. 19 is a diagram for explaining a method of explaining features of a scene from the pose information on the plurality of persons according to the present embodiment. A features extracting unit 107 according to the present embodiment extracts local pose features from each feature point or a subset of feature points, not from overall pose information. By clustering the local pose features relative to a large number of images, a codebook 1901 of the features is generated as illustrated in FIG. 19. By retrieving a cluster to which new local pose features belong in the codebook, vector data can be converted into a code (vw:Visual Word). A histogram 1903 can be obtained by counting frequencies of the codes regarding all the local pose features in the image, the histogram can be used as the features of the entire image in which the pose information is reflected. In FIG. 19, for example, it is indicated that a features component of "pointing a finger" corresponds to a code vw5 of the histogram. Regarding images 1902 and 1904 of "some people point their fingers at a squatting person", histograms 1903 and 1905 having similar features are extracted. Therefore, by performing the retrieval with the features, similar scenes can be retrieved. Since person arrangement information is lost by forming the histogram, for example, if the screen is divided into regions and the histogram is calculated from each region, the features can maintain the position information in some degree.

FIG. 20 is a diagram of features extracting processing on an entire image to which the pose information is reflected according to the present embodiment. In FIG. 20, a pose estimating unit 106 estimates the pose information from an image (S2001). This processing is the same as step S502 in FIG. 5.

A features extracting unit 107 executes steps S2003 to S2005 for all the feature points of a person detected in step S2001 (S2002).

The features extracting unit 107 extracts features from the feature point (S2003). The features of the feature point may be, for example, image features around the feature point, a distance and an angle with respect to an adjacent feature point may be used as pose features. Furthermore, instead of extracting the features for each feature point, pose features may be extracted for each subset of poses. For example, subsets of poses can be used, such as "head shoulder={head, neck, right shoulder, left shoulder}", "right upper body={right shoulder, right elbow, right wrist}", "left upper body={left shoulder, left elbow, left wrist}", "pose={neck, left waist, right waist}", "right lower body={right waist, right knee, right ankle}", and "left lower body={left waist, left knee, left ankle}". In addition, image features may be extracted for each subset of images. The features extracting unit 107 converts the features obtained in step S2003 into a code (S2004). The features can be converted into the code by using the codebook which has been constructed in advance as described with reference to FIG. 19. Furthermore, different codebooks may be used for respective feature points and respective subsets of poses.

The features extracting unit 107 updates a frequency of the code obtained in step S2004 on the histogram (S2005).

When the features extracting unit 107 has completed execution of steps S2003 to S2005 for all the features in the image, the features extracting unit 107 changes the histogram into the features, registers the changed features in the image database 108, and terminates the processing (S2007). At this time, values may be normalized according to the total number of the feature points.

As described above, according to the present embodiment, by specifying the image to be a query, the user can compare features of the entire image accumulated in the image database and retrieve similar scenes.

Although the embodiments have been described above, the present invention is not limited to the embodiments and includes various modifications. For example, the embodiments have been described in detail for easy understanding of the present invention. The embodiments are not limited to those including all the components described above. Also, a part of the components of the embodiment can be replaced with that of the other embodiment, and the components of the embodiment can be added to the other embodiment. Also, a part of the components of each embodiment can be deleted, replaced with that of the other embodiment, and a part of the other embodiment can be added to the components of the embodiment. In addition, a part of or all of the configurations and functions may be realized by hardware or software.

What is claimed is:

1. An image retrieving apparatus comprising:

a storage device configured to store an image database in which a plurality of images are associated with a plurality of sets of a fixed-number of pose feature points and coordinate values thereof which describe a plurality of poses present in the plurality of images;

a processor; and a memory configured to store instructions that, when executed by the processor, cause the processor to:

recognize a pose of a first target present in a first image, extract pose feature points and coordinate values thereof present in the pose of the first target in the first image, and determine that coordinate values of first pose feature points of the first target in the first image cannot be extracted in the first image, obtain two or more images from the image database that are similar to the first image based on image features of the first target in the first image and information indicating at least one of a time, place and attribute of the first target, determine one or more sets of second pose feature points and coordinate values in the two or more images from the database that are similar to the first image, estimate the coordinate values of the first pose feature points of the first target in the first image that cannot be extracted based on the one or more sets of second pose feature points and coordinate values, and store the first image in association with a set of the fixed number of the estimated and extracted pose feature points and coordinate values thereof which describe the pose of the first target in the image database, and wherein the memory is further configured to store instructions that, when executed by the processor, cause the processor to:

generate a retrieval query from pose information specified by a user, and retrieve one or more of the images which are associated with one or more of the sets of the pose feature points and coordinate values from the image database which are similar to the retrieval query.

2. The image retrieving apparatus according to claim 1, wherein the memory is configured to store instructions that, when executed by the processor, cause the processor to:

detect a region of the first target from the first image and recognize the pose of the first target included in the detected region, and extract pose feature points and coordinate values thereof from the region of the first target.

3. The image retrieving apparatus according to claim 1, wherein the memory is configured to store instructions that, when executed by the processor, cause the processor to:
convert the pose information specified by the user into the retrieval query which includes a set of the fixed-number of pose feature points and coordinate values thereof, and
retrieve one or more of the images which are associated with one or more of the sets of the pose feature points and coordinate values which are similar to the retrieval query and obtain original image information of the retrieved similar images from the image database.

4. The image retrieving apparatus according to claim 3, wherein the memory is configured to store instructions that, when executed by the processor, cause the processor to:
generate the retrieval query from the pose information specified by the user and a retrieval condition other than the pose information, and
retrieve one or more of the images which are associated with one or more of the sets of the pose feature points and coordinate values which are similar to the retrieval query from the image database and obtain original image information of the retrieved similar images from the image database.

5. The image retrieving apparatus according to claim 1, further comprising:
a display apparatus,
wherein the memory is configured to store instructions that, when executed by the processor, cause the processor to:
convert the pose information specified by the user into a filter condition,
obtain a second image to serve as a background image,
retrieve one or more of the images which are associated with one or more of the sets of the pose feature points and coordinate values from the image database which are similar to the retrieval query,
calculate a degree of similarity of the filter condition and the sets of the pose feature points and coordinate values in the one or more images retrieved from the image database,
in a case where the degree of similarity is equal to or more than a predetermined value, synthesize a target associated one of the sets of the pose feature points and coordinate values which are similar to the retrieval query from the image database into the background image, and
in a case where the degree of similarity is not equal to or more than the predetermined value, synthesize the pose information specified by the user into the background image.

6. The image retrieving apparatus according to claim 1, wherein the memory is configured to store instructions that, when executed by the processor, cause the processor to:
change a point of view of a 3D model representing the pose information specified by the user,
project the 3D model on a plane to obtain pose feature points and coordinate values of the 3D model on the plane, and
generate the retrieval query from the obtained pose feature points and coordinate values of the 3D model projected on the plane.

7. The image retrieving apparatus according to claim 1, wherein the storage device is configured to store the image database in which the plurality of images are associated with a plurality of tracking IDs of a plurality of targets present in the plurality of images and associated with the plurality of sets of the fixed-number of pose feature points and coordinate values thereof which describe the plurality of poses of the plurality of targets present in the plurality of images,
wherein the memory is configured to store instructions that, when executed by the processor, cause the processor to:
retrieve plural images which are associated with one or more of the sets of the pose feature points and coordinate values which are associated with a same tracking ID and which are similar to the retrieval query from the image database, the retrieved plural images representing a trajectory of the target have the same tracking ID over a period of time.

8. The image retrieving apparatus according to claim 1, wherein the storage device is configured to store the image database in which the plurality of images are associated with the plurality of sets of a fixed-number of pose feature points and coordinate values thereof which describe the plurality of poses present in the plurality of images and are associated with a plurality of sets of image feature points and values thereof which describe information other than the poses present in the plurality of images,
wherein the memory is configured to store instructions that, when executed by the processor, cause the processor to:
generate the retrieval query from a second image specified by the user and the pose information specified by the user, and
retrieve the one or more of the images which are associated with one or more of the sets of the pose feature points and coordinate values and associated with one or more sets of the image features points and values thereof which are similar to the second image and the pose information of the retrieval query.

9. An image retrieving method to retrieve images from an image database in which a plurality of images are associated with a plurality of sets of a fixed-number of pose feature points and coordinate values thereof which describe a plurality of poses present in the plurality of images, the image retrieving method comprising:
recognizing a pose of a first target present in a first image;
extracting pose feature points and coordinate values thereof present in the pose of the first target in the first image;
determine coordinate values first pose feature points of the first target in the first image that cannot be extracted in the first image, obtain two or more images from the image database that are similar to the first image based on image features of the first target in the first image and information indicating at least one of a time, place and attribute of the first target, determine one or more sets of second pose feature points and coordinate values in the two or more images from the database that are similar to the first image, estimate the coordinate values of the first pose feature points of the first target in the first image that cannot be extracted based on the one or more sets of second pose feature points and coordinate values, and store the first image in association with a set of the fixed number of the estimated and extracted pose feature points and coordinate values thereof which describe the pose of the first target in the image database;
generating a retrieval query from pose information specified by a user; and
retrieving one or more of the images which are associated with one or more of the sets of the pose feature points and coordinate values from the image database which are similar to the retrieval query.

10. The image retrieving method according to claim 9, comprising:
    converting the pose information specified by the user into the retrieval query which includes a set of the fixed-number of pose feature points and coordinate values thereof; and
    retrieving one or more of the images which are associated with one or more of the sets of the pose feature points and coordinate values which are similar to the retrieval query and obtain original image information of the retrieved similar images from the image database.

11. The image retrieving method according to claim 9, comprising:
    changing a point of view of a 3D model a point of view of a 3D model representing the pose information specified by the user;
    projecting the 3D model on a plane to obtain pose feature points and coordinate values of the 3D model on the plane; and
    generating the retrieval query from the obtained pose feature points and coordinate values of the 3D model projected on the plane.

12. The image retrieving method according to claim 9, wherein the storage device is configured to store the image database in which the plurality of images are associated with a plurality of tracking IDs of a plurality of targets present in the plurality of images and associated with the plurality of sets of the fixed-number of pose feature points and coordinate values thereof which describe the plurality of poses of the plurality of targets present in the plurality of images, and the image retrieving method further comprising:
    retrieving plural images which are associated with one or more of the sets of the pose feature points and coordinate values which are associated with a same tracking ID and which are similar to the retrieval query from the image database, the retrieved plural images representing a trajectory of the target have the same tracking ID over a period of time.

13. The image retrieving method according to claim 9, wherein the storage device is configured to store the image database in which the plurality of images are associated with the plurality of sets of a fixed-number of pose feature points and coordinate values thereof which describe the plurality of poses present in the plurality of images and are associated with a plurality of sets of image feature points and values thereof which describe information other than the poses present in the plurality of images,
    the image retrieving method further comprising:
    generating the retrieval query from a second image specified by the user and the pose information specified by the user;
    retrieving the one or more of the images which are associated with one or more of the sets of the pose feature points and coordinate values and associated with one or more sets of the image features points and values thereof which are similar to the second image and the pose information of the retrieval query.

* * * * *